US010152299B2

(12) United States Patent
Sumner et al.

(10) Patent No.: US 10,152,299 B2
(45) Date of Patent: Dec. 11, 2018

(54) REDUCING RESPONSE LATENCY OF INTELLIGENT AUTOMATED ASSISTANTS

(71) Applicant: Apple Inc., Cupertino, CA (US)

(72) Inventors: Michael R. Sumner, Cupertino, CA (US); Evan S. Dibiase, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 14/839,643

(22) Filed: Aug. 28, 2015

(65) Prior Publication Data

US 2016/0259623 A1 Sep. 8, 2016

Related U.S. Application Data

(60) Provisional application No. 62/129,449, filed on Mar. 6, 2015.

(51) Int. Cl.
*G06F 3/16* (2006.01)
*G06F 17/30* (2006.01)
(Continued)

(52) U.S. Cl.
CPC ............ *G06F 3/167* (2013.01); *G06F 3/0484* (2013.01); *G06F 17/30684* (2013.01);
(Continued)

(58) Field of Classification Search
CPC .. G06F 3/167; G06F 3/0484; G06F 17/30976; G06F 17/30684; G06F 17/30241; H04L 67/10; G10L 15/30; G10L 15/183
See application file for complete search history.

(56) References Cited

U.S. PATENT DOCUMENTS

2008/0172698 A1* 7/2008 Berger ................. G06F 1/3203
725/50
2008/0243501 A1* 10/2008 Hafsteinsson ........ G10L 15/265
704/235
(Continued)

FOREIGN PATENT DOCUMENTS

WO 2015030796 A1 3/2015

OTHER PUBLICATIONS

International Preliminary Report on Patentability received for PCT Patent Application No. PCT/US2016/021103, dated Sep. 21, 2017, 11 pages.
(Continued)

*Primary Examiner* — Aaron Lowenberger
(74) *Attorney, Agent, or Firm* — Dentons US LLP

(57) ABSTRACT

Systems and processes for reducing response latency of intelligent automated assistants are provided. In one example process, a speech input containing a user request can be received from a user. A representation of the speech input can be transmitted. A domain signal representing a relevant domain associated with the user request can be received. The process can determine whether the relevant domain is associated with a predefined action of a set of predefined actions. In response to determining that the relevant domain is associated with a predefined action of a set of predefined actions, the predefined action can be performed. Data content relevant to satisfying the user request can be received. A result based on the data content can be outputted to at least partially satisfy the user request.

32 Claims, 17 Drawing Sheets

(51) Int. Cl.
 G06F 3/0484 (2013.01)
 H04L 29/08 (2006.01)
 G10L 15/30 (2013.01)
 G10L 15/183 (2013.01)
(52) U.S. Cl.
 CPC ...... *G06F 17/30976* (2013.01); *G10L 15/183* (2013.01); *G10L 15/30* (2013.01); *H04L 67/10* (2013.01); *G06F 17/30241* (2013.01)

(56) References Cited

U.S. PATENT DOCUMENTS

| | | | | |
|---|---|---|---|---|
| 2012/0078635 | A1* | 3/2012 | Rothkopf | G10L 15/30 704/270.1 |
| 2013/0152092 | A1* | 6/2013 | Yadgar | G10L 15/1822 718/102 |
| 2014/0236986 | A1 | 8/2014 | Guzman | |
| 2014/0245140 | A1* | 8/2014 | Brown | G06Q 10/06 715/708 |
| 2014/0372356 | A1* | 12/2014 | Bilal | G06F 9/445 706/46 |
| 2016/0189717 | A1* | 6/2016 | Kannan | G10L 17/22 704/275 |

OTHER PUBLICATIONS

International Search Report and Written Opinion received for PCT Patent Application No. PCT/US2016/021103, dated Jun. 8, 2016, 15 pages.

* cited by examiner

REDUCING RESPONSE LATENCY OF INTELLIGENT AUTOMATED ASSISTANTS

CROSS-REFERENCE TO RELATED APPLICATION

This application claims priority from U.S. Provisional Ser. No. 62/129,449, filed on Mar. 6, 2015, entitled REDUCING RESPONSE LATENCY OF INTELLIGENT AUTOMATED ASSISTANTS, which is hereby incorporated by reference in its entirety for all purposes.

FIELD

This relates generally to intelligent automated assistants and, more specifically, to reducing response latency of intelligent automated assistants.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

With the proliferation of portable multifunctional devices, such as smart phones and tablet computers, it can be desirable to implement digital assistants on mobile computing platforms. However, one inherent limitation of mobile computing platforms is their limited computing resources (e.g., memory and processor power). Digital assistants implemented on mobile platforms can thus suffer from longer processing times and thus greater latency in responding to user requests. This can result in poor user experience, which can limit the widespread adoption of digital assistants on mobile platforms.

SUMMARY

Systems and processes for potentially reducing response latency of intelligent automated assistants are provided. In one example process, a speech input containing a user request can be received from a user. A representation of the speech input can be transmitted. A domain signal representing a relevant domain associated with the user request can be received. The process can determine whether the relevant domain is associated with a predefined action of a set of predefined actions. In response to determining that the relevant domain is associated with a predefined action of a set of predefined actions, the predefined action can be performed. Data content relevant to satisfying the user request can be received. A result based on the data content can be outputted to at least partially satisfy the user request.

DETAILED DESCRIPTION

Figure 1:
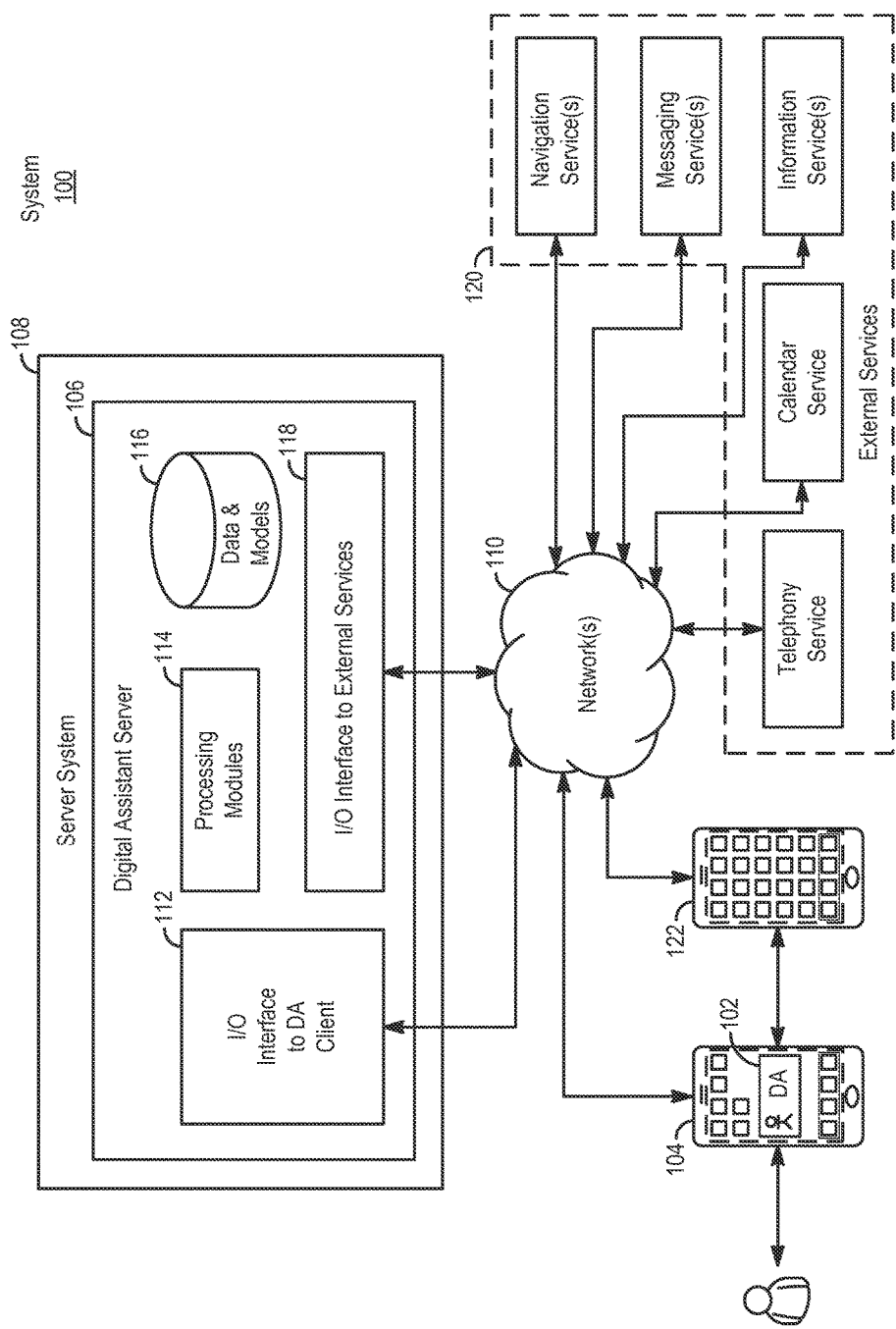
FIG. 1 is a block diagram illustrating a system and environment for implementing a digital assistant according to various examples.

In the following description of examples, reference is made to the accompanying drawings in which it is shown by way of illustration specific examples that can be practiced. It is to be understood that other examples can be used and structural changes can be made without departing from the scope of the various examples.

Systems and processes for potentially reducing latency of intelligent automated assistants are provided. In one example process, a speech input containing a user request can be received at a user device. A representation of the speech input can be transmitted from the user device to a server. A domain signal representing a relevant domain associated with the user request can be received from the server. The process can determine, at the user device, whether the relevant domain is associated with a predefined action of a set of predefined actions. In response to determining that the relevant domain is associated with a predefined action of a set of predefined actions, the predefined action can be performed at the user device. Data content relevant to satisfying the user request can be received from the server. The domain signal can be received prior to receiving the data content. A result based on the data content can be outputted to at least partially satisfy the user request.

By utilizing the systems and processes for potentially reducing latency of intelligent automated assistants as described herein, a quicker response to user requests can be obtained from the digital assistant on the user device. For example, performing the predefined action can be prerequisite to outputting the result. By receiving the domain signal prior to receiving the data content, the predefined action can be performed prior to receiving the data content. In this way, the result can be outputted to the user more quickly from the time the data content is received. This can improve user experience, which can lead to greater adoption of digital assistants by consumers.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input can both be outputs and, in some cases, can be separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
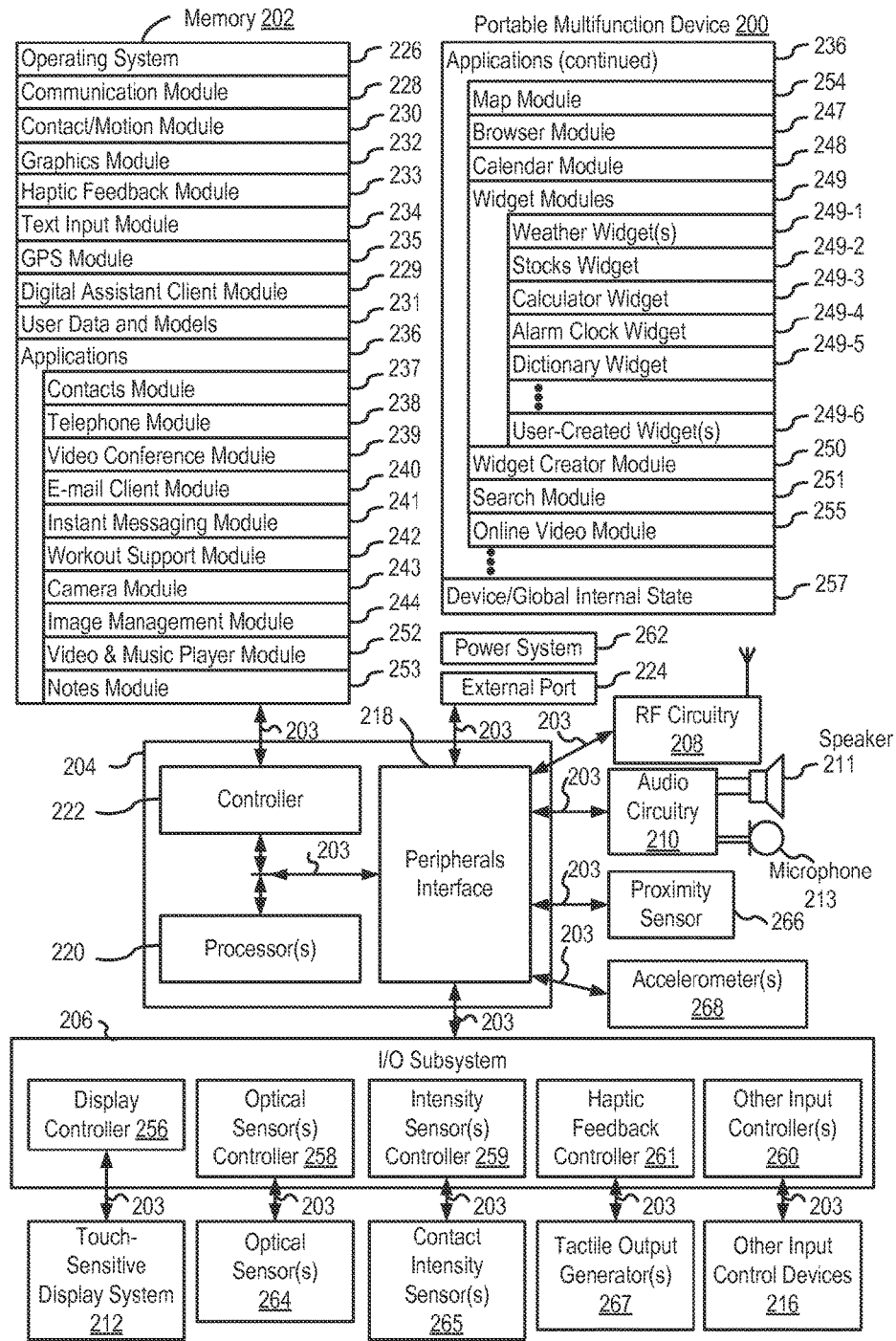
FIG. 2A is a block diagram illustrating a portable multifunction device implementing the client-side portion of a digital assistant according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of processes 800 and 900, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of processes 800 and 900, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200.

Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
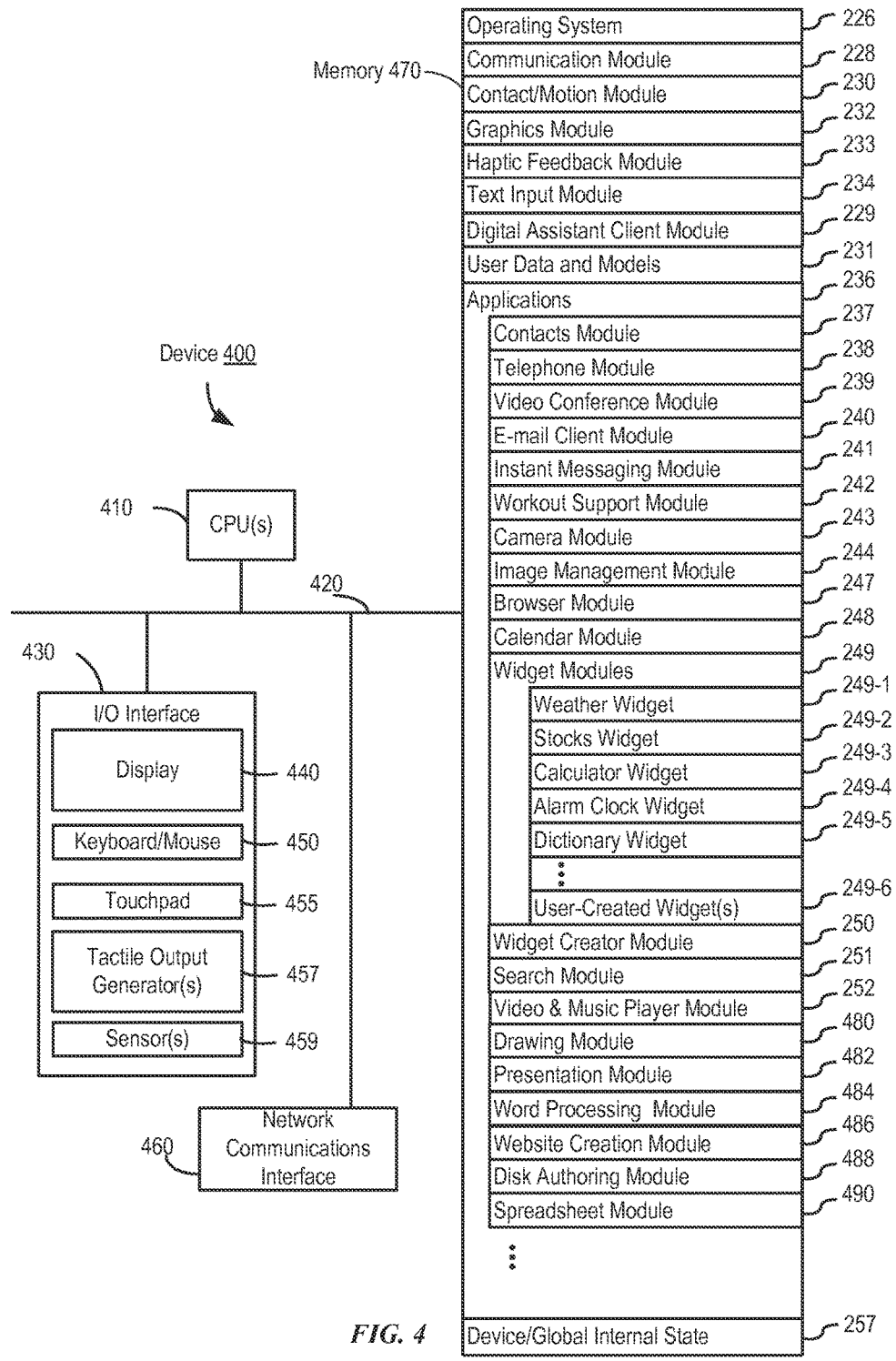
FIG. 4 is a block diagram of an exemplary multifunction device implementing the client-side portion of a digital assistant according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:
  Contacts module 237 (sometimes called an address book or contact list);
  Telephone module 238;
  Video conference module 239;
  E-mail client module 240;
  Instant messaging (IM) module 241;
  Workout support module 242;
  Camera module 243 for still and/or video images;
  Image management module 244;
  Video player module;
  Music player module;
  Browser module 247;
  Calendar module 248;
  Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
  Widget creator module 250 for making user-created widgets 249-6;
  Search module 251;
  Video and music player module 252, which merges video player module and music player module;
  Notes module 253;
  Map module 254; and/or
  Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
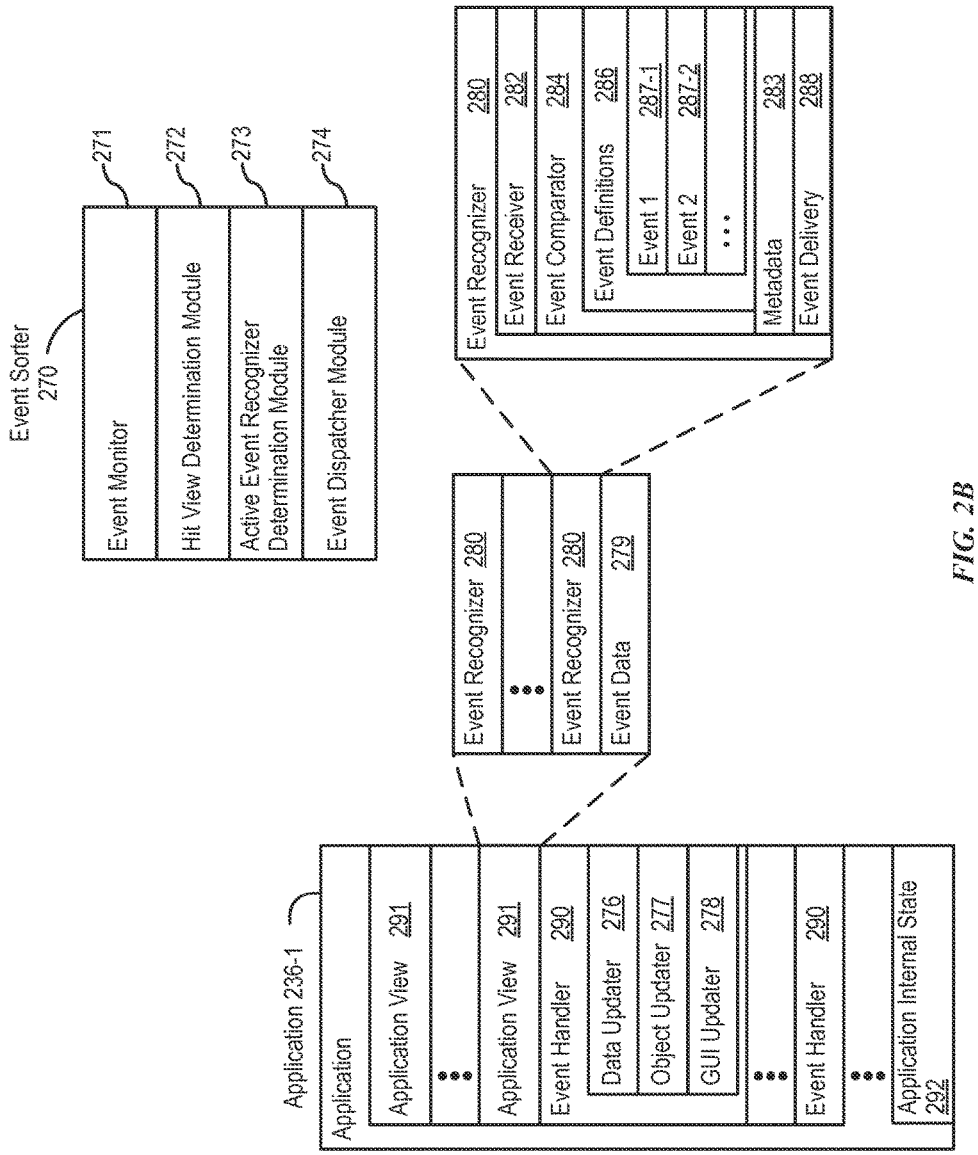
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
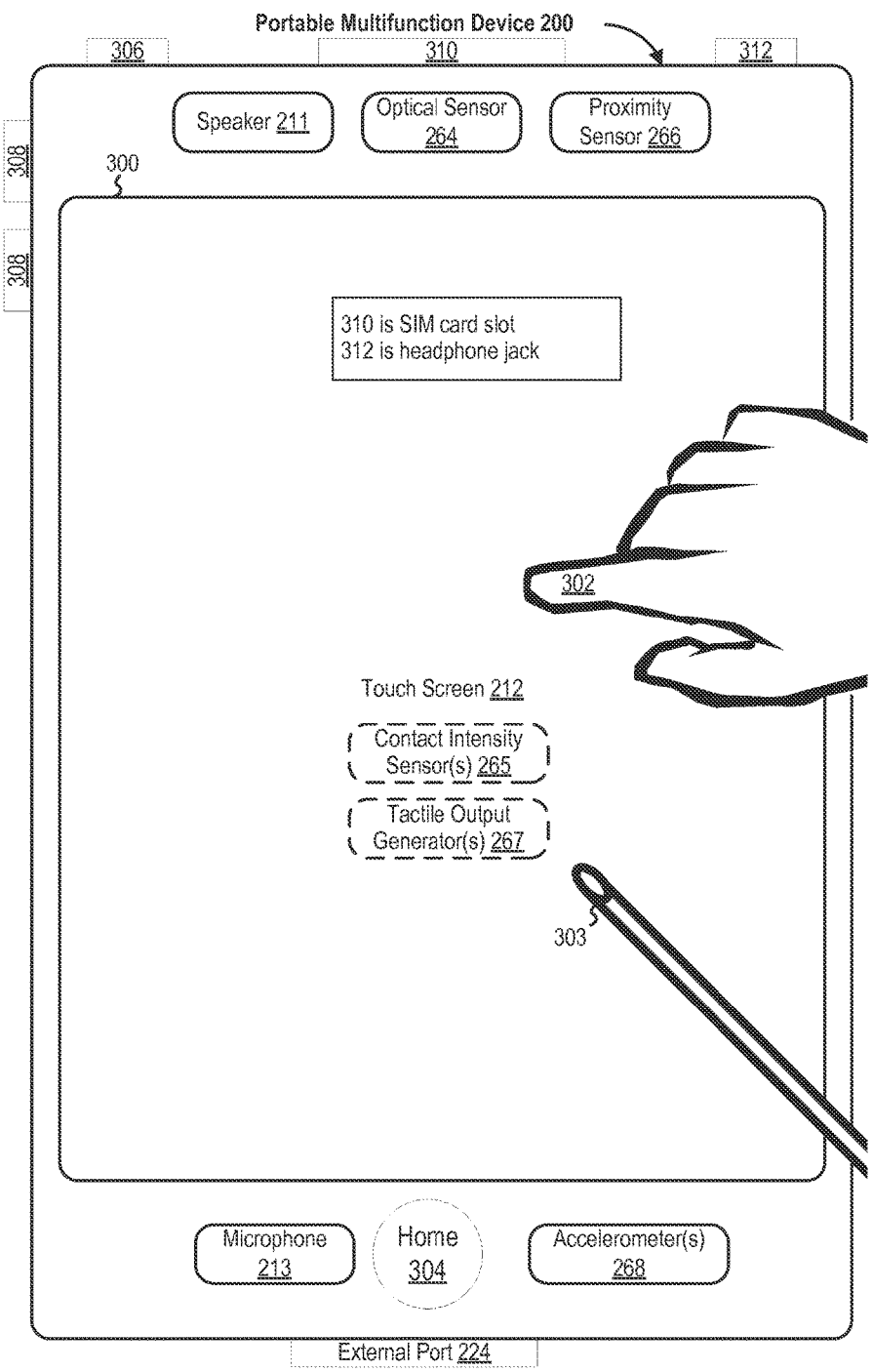
FIG. 3 illustrates a portable multifunction device with a display and a touch-sensitive surface according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
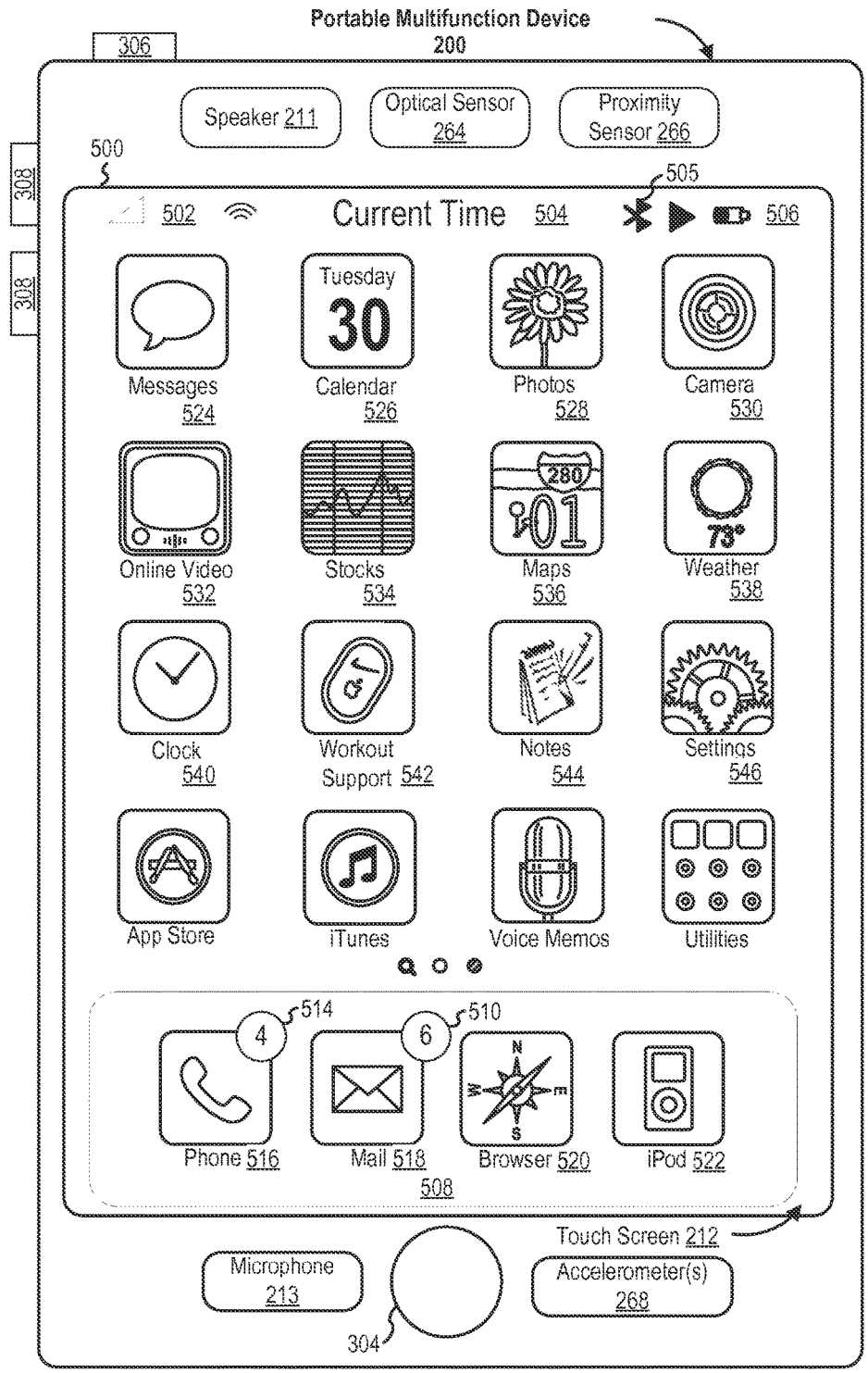
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

- Icon 516 for telephone module 238, labeled "Phone," which optionally includes an indicator 514 of the number of missed calls or voicemail messages;
- Icon 518 for e-mail client module 240, labeled "Mail," which optionally includes an indicator 510 of the number of unread e-mails;
- Icon 520 for browser module 247, labeled "Browser;" and
- Icon 522 for video and music player module 252, also referred to as iPod (trademark of Apple Inc.) module 252, labeled "iPod;" and Icons for other applications, such as:

- Icon 524 for IM module 241, labeled "Messages;"
- Icon 526 for calendar module 248, labeled "Calendar;"
- Icon 528 for image management module 244, labeled "Photos;"
- Icon 530 for camera module 243, labeled "Camera;"
- Icon 532 for online video module 255, labeled "Online Video;"
- Icon 534 for stocks widget 249-2, labeled "Stocks;"
- Icon 536 for map module 254, labeled "Maps;"
- Icon 538 for weather widget 249-1, labeled "Weather;"
- Icon 540 for alarm clock widget 249-4, labeled "Clock;"
- Icon 542 for workout support module 242, labeled "Workout Support;"
- Icon 544 for notes module 253, labeled "Notes;" and
- Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
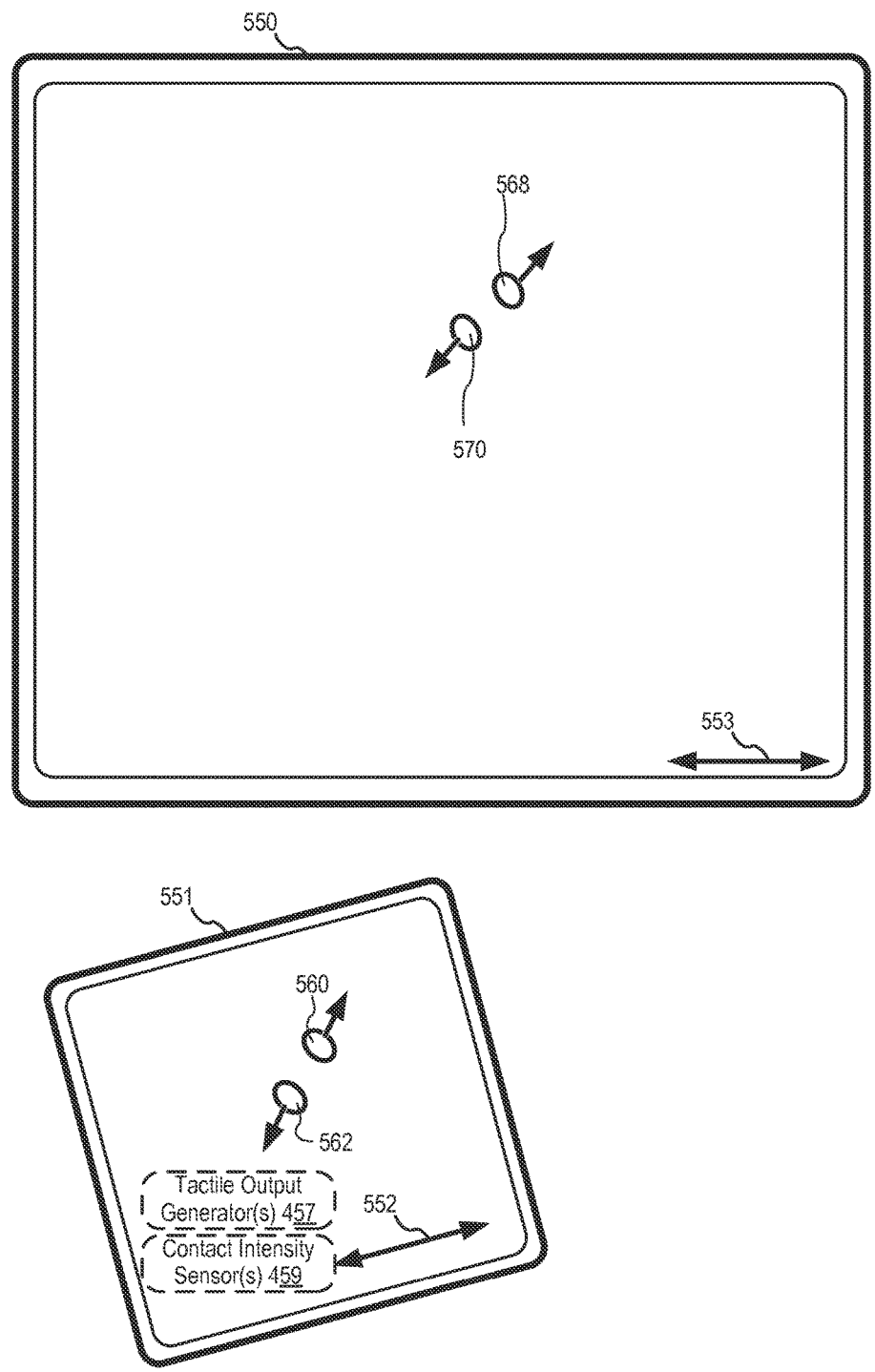
FIG. 5B illustrates an exemplary user interface for a multifunction device with a touch-sensitive surface that is separate from the display according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
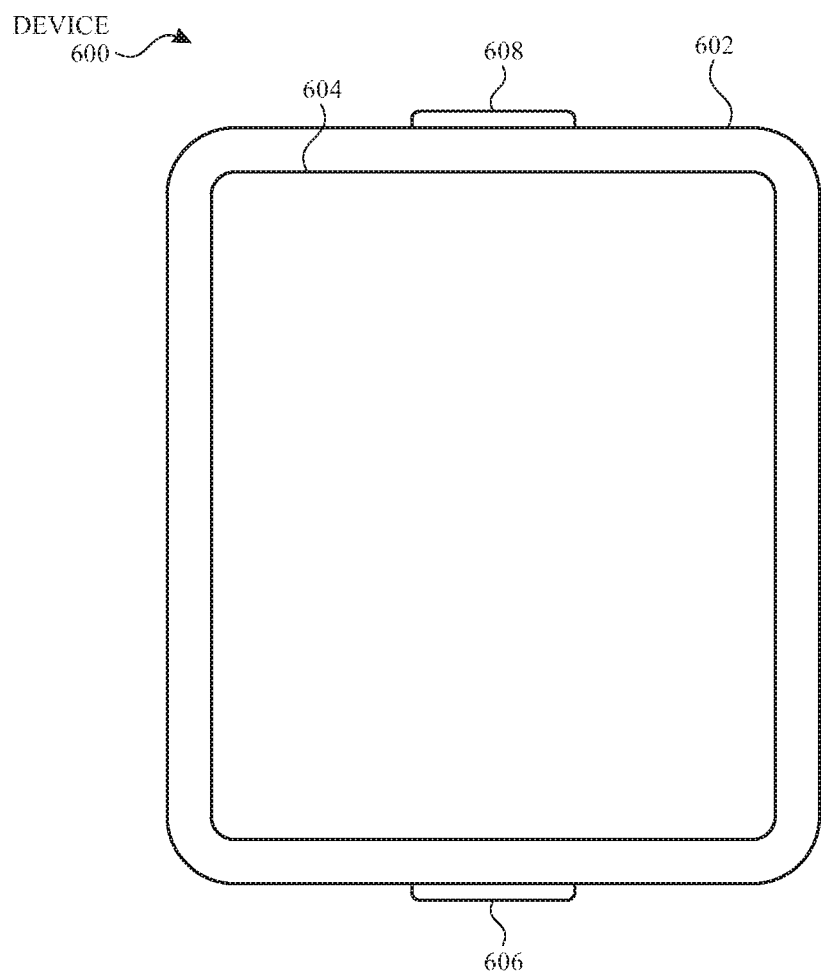
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
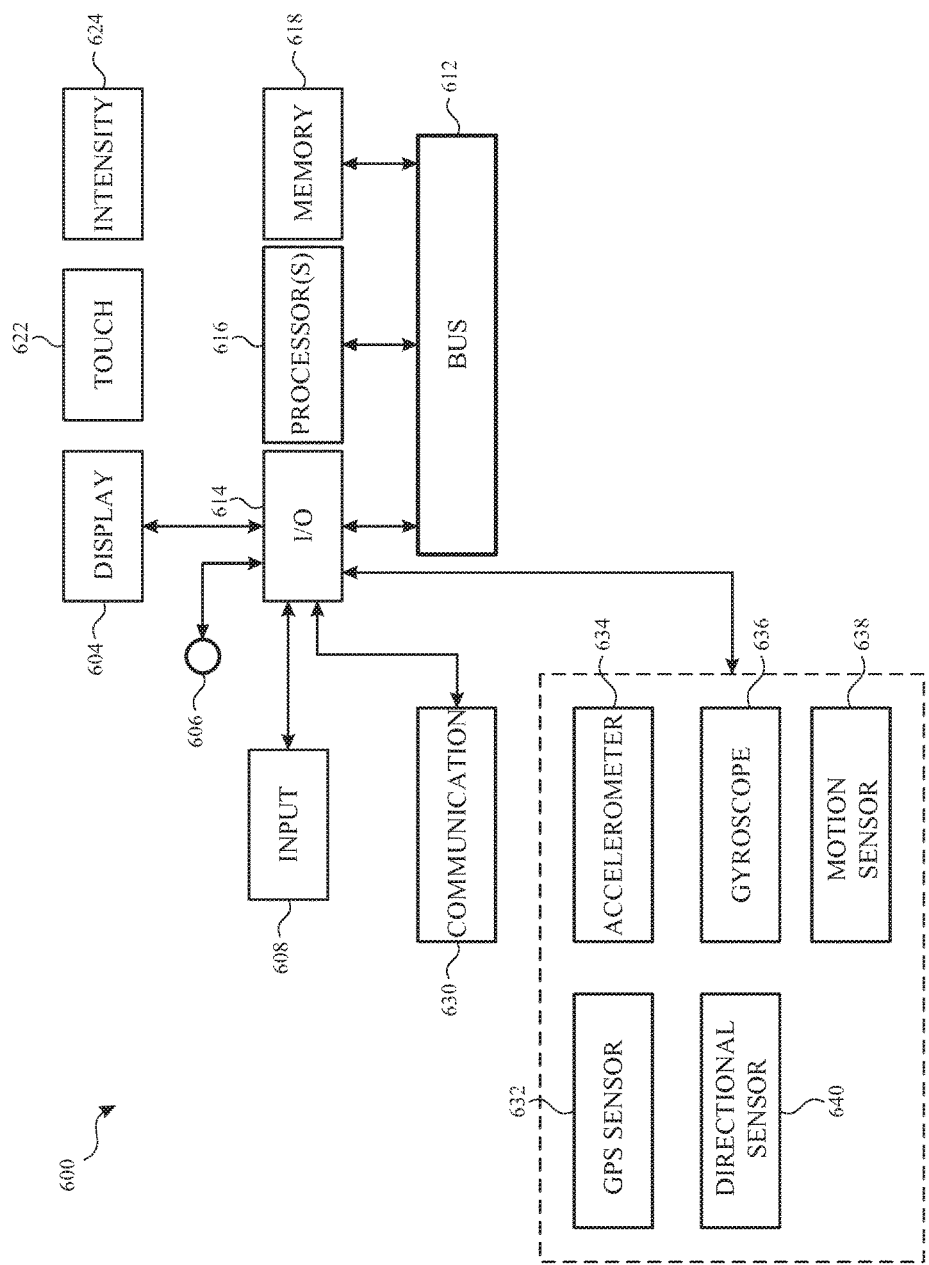
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Figure 8A:
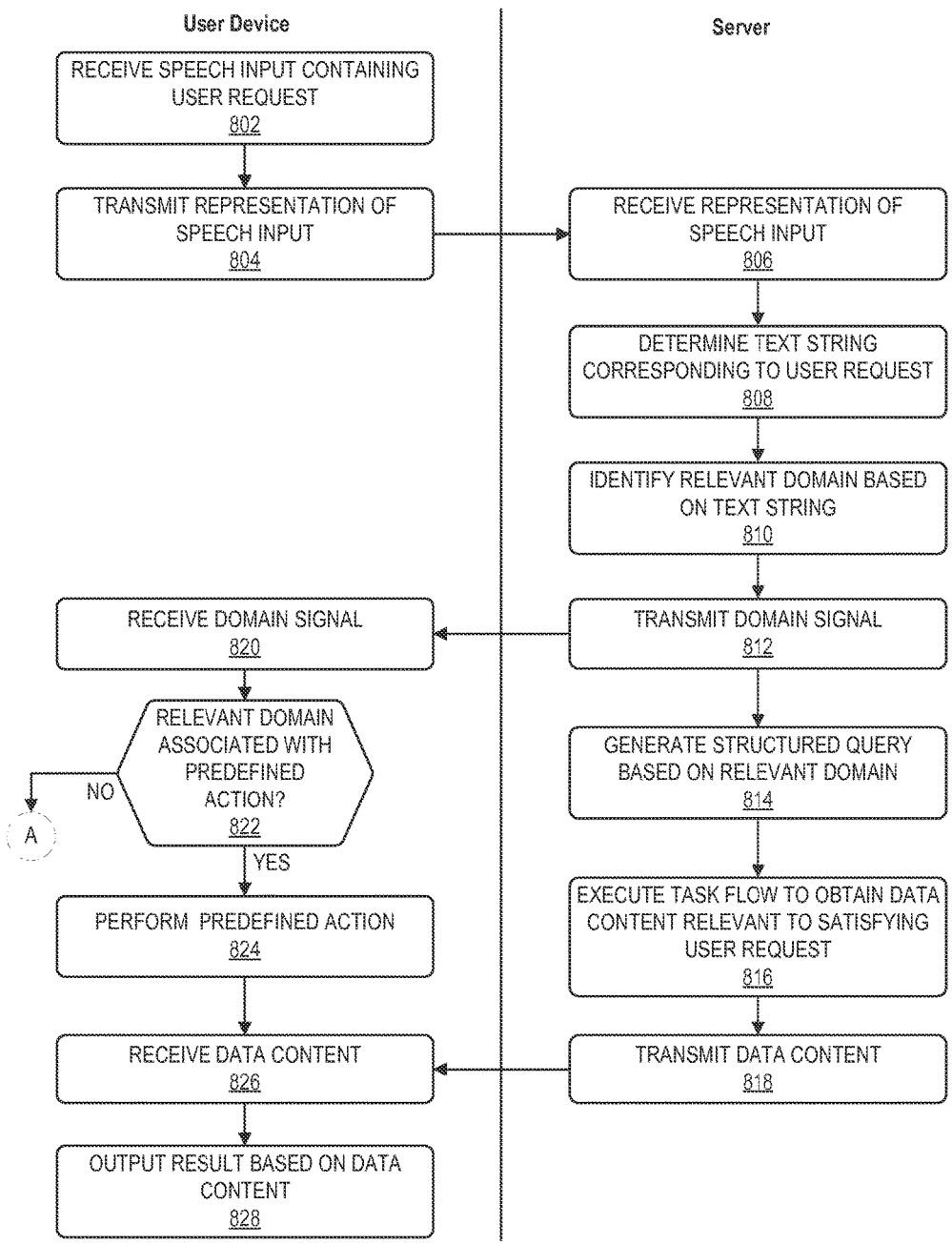
FIGS. 8A-B illustrate a process for potentially reducing response latency of digital assistants according to various examples.
Figure 8B:
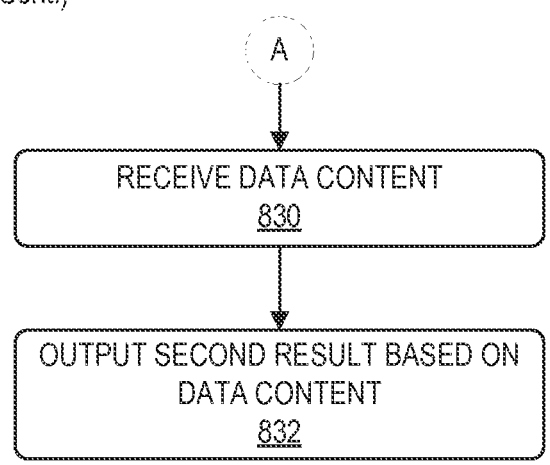
Figure 9:
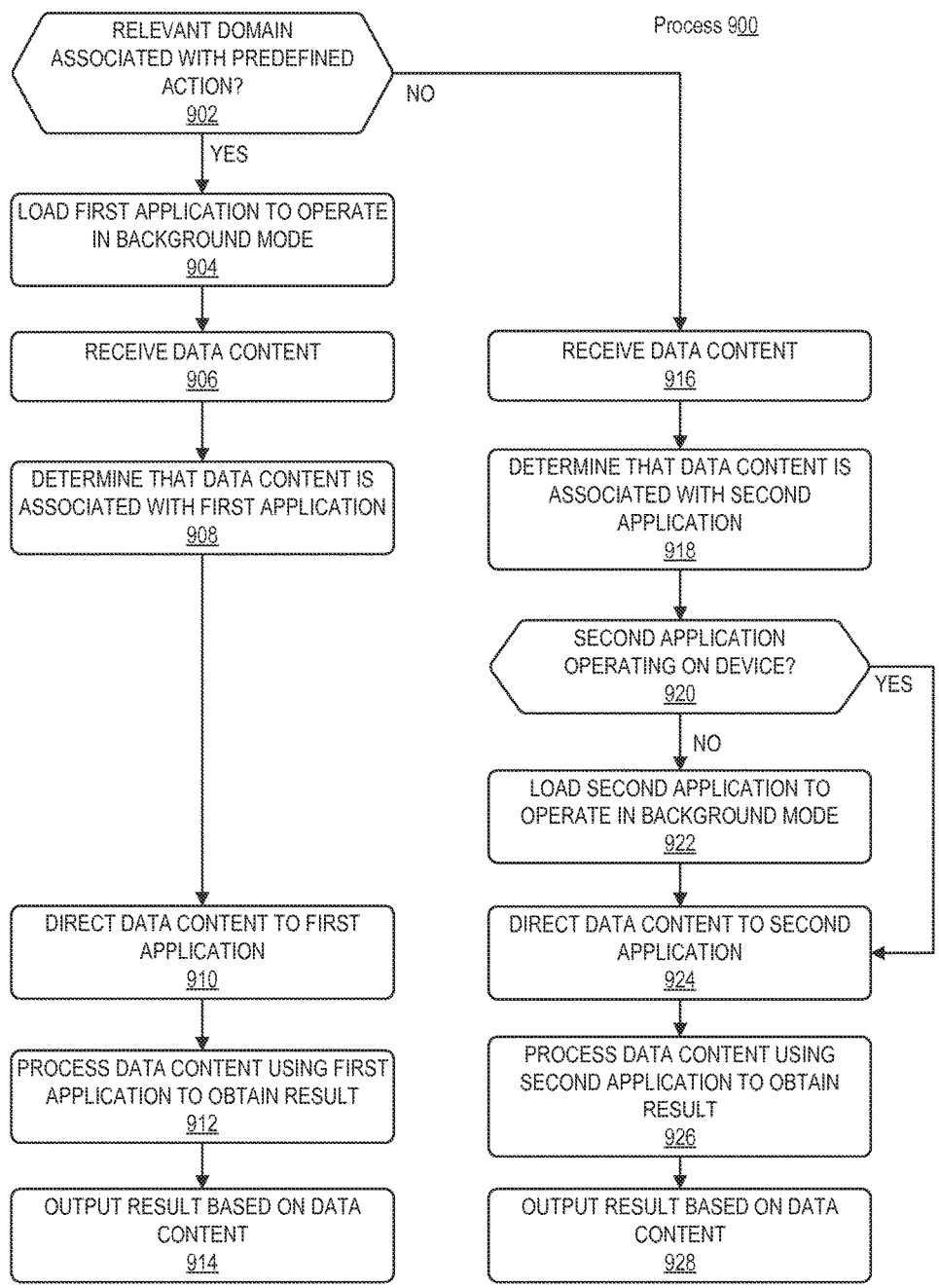
FIG. 9 illustrates a process for potentially reducing response latency of digital assistants according to various examples.

Memory 618 of personal electronic device 600 can be a non-transitory computer-readable storage medium, for storing computer-executable instructions, which, when executed by one or more computer processors 616, for example, can cause the computer processors to perform the techniques described below, including processes 800 and 900 (FIGS. 8A-B and 9). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation)

rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
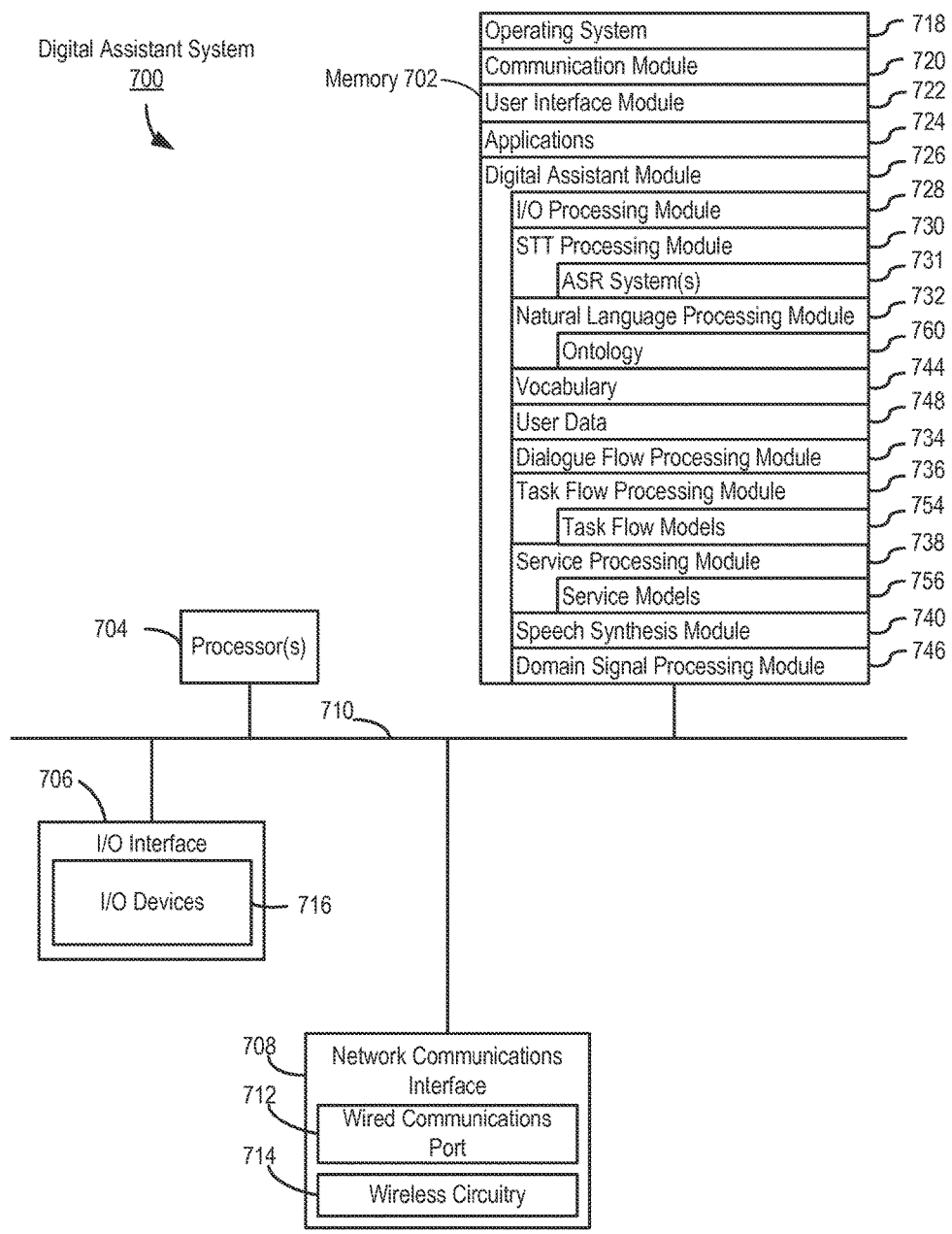
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing processes 800 and 900, described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, speech synthesis module 740, and domain signal processing module 746. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following:

converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
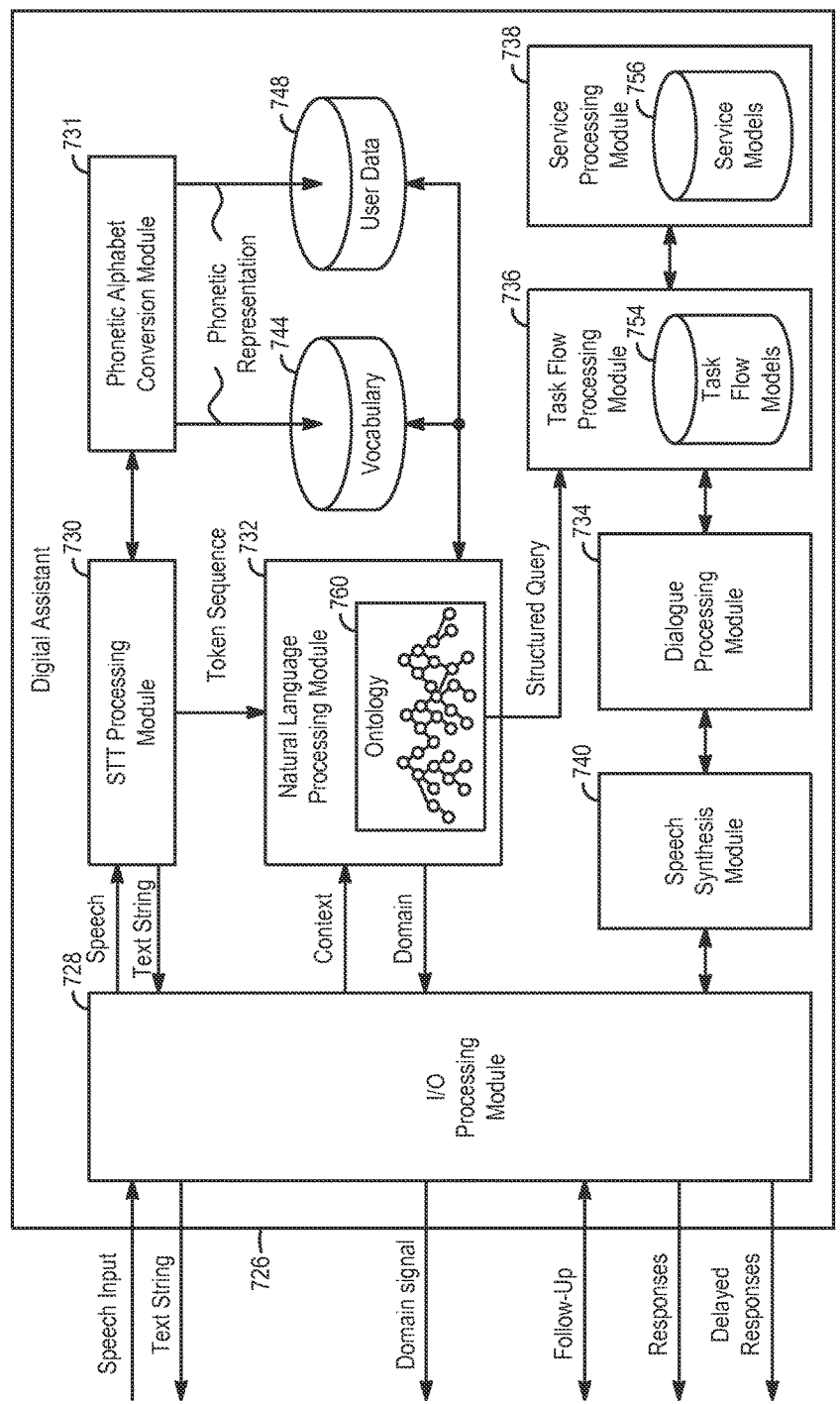
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /təˈmeɪroʊ/ and /təˈmɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /təˈmeɪroʊ/ can be ranked higher than /təˈmɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /təˈmeɪroʊ/ can be associated with the United States, whereas the candidate pronunciation /təˈmɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪroʊ/ (associated with the United States) can be ranked higher than the candidate pronunciation /təˈmɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /təˈmeɪroʊ/ corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /təˈmeɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
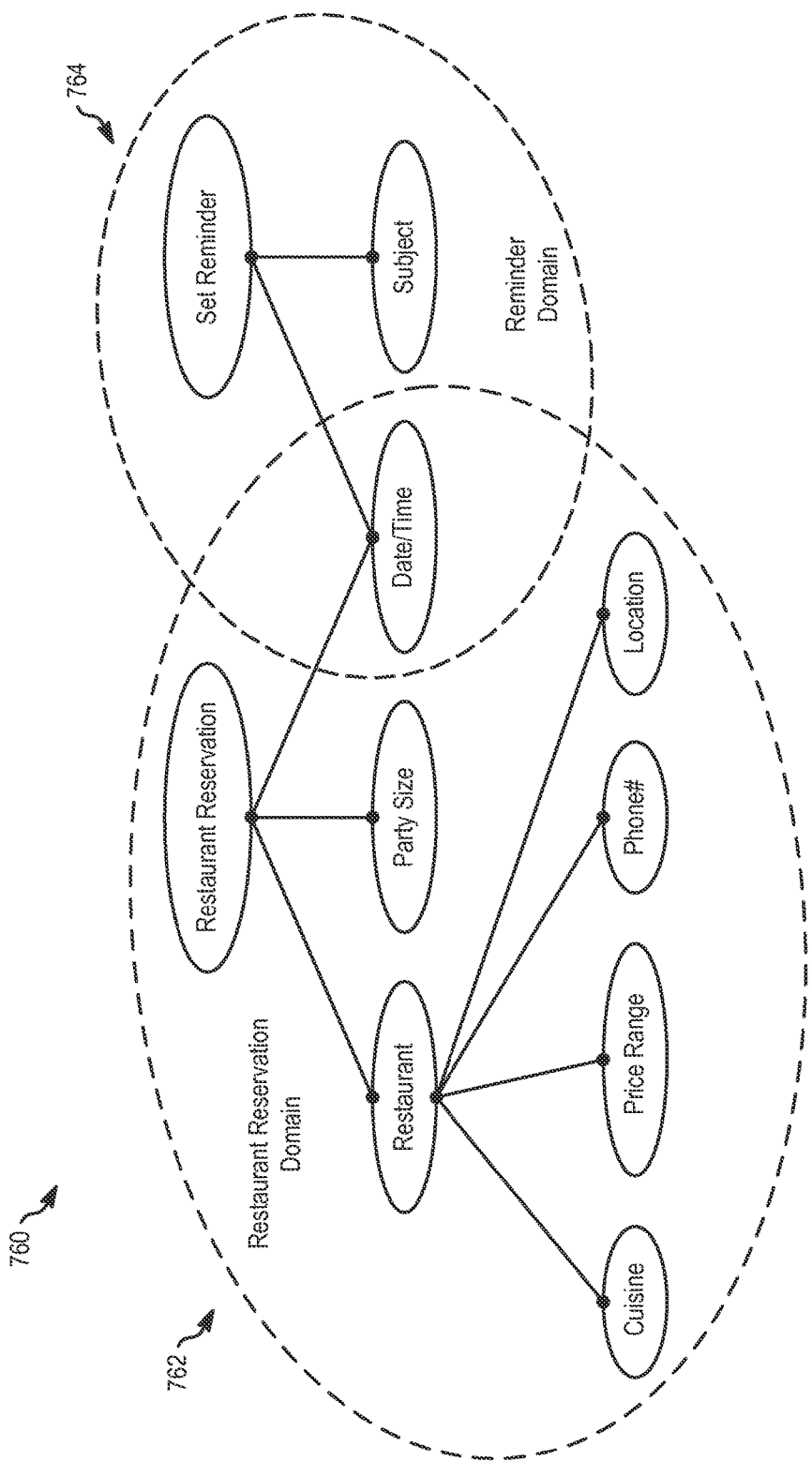
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation,"

"car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In examples where the digital assistant is implemented in a server-client system, natural language processing module 732 can output the domain implicated by the token sequence once the domain has been identified. For example, the domain can be outputted in the form of a domain signal from the server side of the digital assistant to the client side of the digital assistant via I/O processing module 728. To reduce response latency, it can be desirable to minimize any delay in outputting the domain signal after the domain is identified. In some examples, the domain signal can be outputted after the relevant domain is identified and while the structured query is being generated at natural language processing module 732. In other examples, the domain signal can be outputted after the domain is identified and before the structured query has been generated. In yet other examples, the domain signal can be transmitted before the task flow processing module 736 performs the tasks associated with the actionable intent.

In some examples, the client side of the digital assistant can include domain signal processing module 746. For example, the client side of the digital assistant can receive a domain signal representing one or more domains from the server side of the digital assistant. Domain signal processing module 746 can process the domain signal to identify the one or more relevant domains represented by the domain signal and determine whether the one or more relevant domains are associated with one or more predefined actions supported by the user device. For example, domain processing module 746 can include one or more look-up tables, databases, or models that associate a set of predefined domains with a respective set of predefined actions. Using such the one or more tables, databases, or models, domain signal processing module 746 can determine whether the one or more relevant domains are included in the set of predefined domains and determine the one or more predefined actions associated with the one or more relevant domains.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Process for Reducing Response Latency of Intelligent Automated Assistants

FIGS. 8A-B illustrate process 800 for potentially reducing response latency of an intelligent automated assistant according to various examples. Process 800 can be performed using one or more electronic devices implementing a digital assistant. In some examples, process 800 can be performed using a client-server system implementing a digital assistant. In particular, as shown in FIGS. 8A-B, blocks 802, 804, and 820-834 of process 800 can be performed by a client device (e.g., devices 104, 200, 400, or 600 of FIGS. 1, 2A, 4, 6, respectively), whereas blocks 806-818 of process 800 can be performed by a server device (e.g., DA server 106 of FIG. 1). It should be recognized however that in other examples, the individual blocks of process 800 can be distributed in any appropriate manner among one or more computers, systems, or electronic devices. For instances, in some examples, process 800 can be performed entirely on an electronic device (e.g., devices 104, 200, 400, or 600.) While the following discussion describes process 800 as being performed by a digital assistant system (e.g., system 100 and/or digital assistant system 700), it should be recognized that the process or any particular part of the process is not limited to performance by any particular device, combination of devices, or implementation.

At block 802, a speech input containing a user request can be received at an electronic device (e.g., device 104, 200, 400, or 600). In particular, the speech input can be received from a user of the electronic device. In some examples, the speech input can be received via a microphone (e.g., microphone 213) of the electronic device. The electronic device can process (e.g., using audio circuitry 210 or processor(s)) the received speech input and convert the received speech input into a representation of the speech input. For example, the representation can be an electronic signal (digital or analog) or one or more recorded audio files that represent the speech input.

The user request can be any request, including a request seeking an informational answer (e.g., an answer to a question, such as "How far is Earth from the sun?"), a request seeking the performance of a task by the digital assistant (e.g., obtaining directions to a restaurant, composing a text messages, etc.), and the like.

At block 804, the representation of the speech input can be transmitted to a server (e.g., DA server 106). For example, communication circuitry (e.g., RF Circuitry 208) of the electronic device can be used to transmit the representation of the speech input to the server. In some examples, the representation of the speech input can be transmitted to the server via a direct communication connection, such as Bluetooth, NFC, BTLE, or the like, or via a wired or wireless network, such as a local Wi-Fi network. In one such example, the electronic device can establish a Wi-Fi connection to a communication network via a wireless router and transmit the representation of the speech input to the server directly through a communication network (e.g., network(s) 110). In other examples, the electronic device can utilize a second electronic device (e.g., user device 122) as a proxy to transmit the representation of the speech input to the server. In particular, the electronic device can establish a connection to the second electronic device and the second electronic device can be connected to the server via a communication network. The electronic device can thus transmit the representation of the speech input to the server via the second electronic device. A more detailed explanation of transmitting and receiving information to/from the server via the second electronic device is provided below.

At block 806, the representation of a speech input containing the user request can be received by the server from the electronic device. For example, with reference to FIG. 1, the representation of the speech input can be received at the I/O interface (e.g., I/O interface to DA client 112) of DA server 106 from user device 104.

At block 808, a text string corresponding to the user request can be determined. For example, the representation of the speech input can be converted to text using conventional automatic speech recognition techniques. In particular, a STT processing module (e.g., STT processing module 730) of the server can be used to process the representation of the speech input and determine the text string corresponding to the user request. The STT processing module can include one or more ASR systems (e.g., ASR system(s) 731). The one or more ASR systems can extract representative features from the representation of the speech input and the extracted representative features can be processed using one or more speech recognition models and one or more speech recognition engines of the one or more ASR systems to produce intermediate recognitions results (e.g., phonemes, phonemic strings, and sub-words), and ultimately, text recognition results (e.g., words, word strings, or sequence of tokens). The text recognition results can include the text string corresponding to the user request. The text string can be in the form of a sequence of words or a representation of a sequence of words (e.g., a sequence of tokens with each token representing a particular word).

In some examples, the determined text string can be transmitted by the server to the electronic device (e.g., prior to transmitting the domain signal at block 812). The text string can be received by the electronic device and displayed by the electronic device to provide confirmation to the user that the user request is being processed correctly.

At block 810, a relevant domain can be identified from a set of predefined domains based on the text string. For example, a natural language processing module (e.g., natural language processing module 732) of the server can process the text string to determine an actionable intent associated with the user request. In determining an actionable intent of the user, the relevant domain associated with the user request can be identified among a set of predefined domains based on the words and/or phrases in the text string.

As described above with respect to natural language processing module 732, the natural language processing module can include a set of predefined domains. Each domain can be a domain of knowledge associated with a particular topic, concept, or field. Further, each domain can be associated with a set of word and/or phrases (e.g., stored in vocabulary index 744) and with an actionable intent. For example, the set of predefined domains can include a "find a movie" domain that can be associated with a set a words and/or phrases that include "movie," "playing," "theater," "showtimes," and the like. Further, the "find a movie" domain can be associated with the actionable intent of retrieving information related to movies. In some examples, the natural language processing module can include an ontology (e.g., ontology 760) comprising the set of predefined domains. In these examples, each domain can be a domain-specific ontology representing concepts belonging to a specific semantic entity.

The natural language processor can analyze the words and phrases contained in the text string and identify the relevant domain implicated by these words and phrases. For examples, the relevant domain can be identified based on the number of words or phrases in the text string that are associated with the relevant domain and based on the salience of those words or phrases with respect to the relevant domain. In some examples, more than one relevant domain can be identified from the set of predefined domains based on the text string. For example, the natural language processor can identify a first relevant domain and a second relevant domain based on the text string. The first and second relevant domains can be identified at separate times or concurrently.

In some examples, the relevant domain can be identified based on the user request contained in the text string. In these examples, the STT processing module can convert the entire user request into the text string before passing the text string to the natural language processing module to identify the relevant domain. In other examples, the relevant domain can be identified based on only a portion of the text string. In these examples, the STT processing module can pass portions of the text string to the natural language processing module as the representation of the speech input is being converted into text. In one such example, the relevant domain can be identified based on a beginning portion of the text string corresponding to the beginning portion of the user request. This can be advantageous in enabling the relevant domain to be determined more quickly. In particular, the natural language processor would not have to wait until the entire text string is determined at block 808 before beginning to identify the relevant domain.

At block 812, a domain signal representing the relevant domain can be transmitted to the electronic device. The domain signal can include information identifying the relevant domain associated with the user request. The domain signal and the relevant domain represented by the domain signal can be associated with a predefined action supported by the electronic device. As described in greater detail below, the domain signal can be transmitted to the electronic device to cause the predefined action to be performed on the electronic device.

The domain signal can be transmitted using the I/O interface of the server (e.g., I/O interface to DA client 112). It should be recognized that in some examples, the domain signal can represent more than one relevant domain. Further, in some examples, more than one domain signal can be transmitted. For instance, in one example, a first relevant domain and a second relevant domain can be identified at block 810 based on the text string. A domain signal representing the first relevant domain and the second relevant domain can be transmitted to the server. Alternatively, a first domain signal representing the first relevant domain and a second domain signal representing the second relevant domain can be transmitted to the server.

The domain signal can be transmitted once the relevant domain is identified. For example, the domain signal can be transmitted from the server to the electronic device less than 100 ms, 50 ms, 25 ms, 10 ms, 5 ms, or 2 ms after the relevant domain is identified at block 810. In some examples, the domain signal can be transmitted after the relevant domain is identified and while the structured query is being generated at block 814. In some examples, the domain signal can be transmitted after the relevant domain is identified and before the structured query has been generated at block 814. In some examples, the domain signal can be transmitted before the data content at block 818 is transmitted.

It can be desirable to minimize the time interval from when the relevant domain is identified to when the domain signal is transmitted to the electronic device. As will become more evident later, transmitting the domain signal shortly after identifying the relevant domain can enable the result to be outputted more quickly to the user at block 828 than waiting for the speech input to be fully processed. This can improve user experience in interacting with the digital assistant.

At block 814, a structured query representing an actionable intent associated with the relevant domain can be generated. Generating the structured query can be part of natural language processing performed by the natural language processor (e.g., natural language processing module 732). In some examples, generating the structured query at block 814 can be performed upon identifying the relevant domain at block 816. The structured query can include all pertinent information needed to define the ultimate task or set of tasks required to fulfill the user request.

Generating the structured query can include parsing the text string to extract relevant information required for the actionable intent. For example, if the relevant domain is the "find a movie" domain, the text string can be parsed to extract relevant information related to the search location, timeframe of the search, and the genre of movies to be searched. Generating the structured query can further include populating one or more parameters of the structured query with relevant information derived from parsing the text string. The one or more parameters can be associated with the relevant domain. For example, if the relevant domain is "find a movie," the one or more parameters to be populated can be {location}, {time}, and {genre}.

In some examples, it can be determined while generating the structured query that the relevant domain or the actionable intent associated with the relevant domain is unable to fulfill the user request. For example, while generating the structured query for the relevant domain of "find a movie," the {location} parameter can be populated with a location value that is not supported by the relevant domain. In particular, the "find a movie" domain can be associated with executing a search in a particular movies database and it can be determined that the particular database does not include information pertaining to the location value. In these examples, in response to determining that the relevant domain or the actionable intent associated with the relevant domain is unable to fulfill the user request, a second relevant domain of the set of predefined domains can be identified by the natural language processor. For example, a second relevant domain of "perform local web search" can be identified by the natural language process. The second relevant domain can be identified based on the text string and/or the relevant domain. A second domain signal representing the second relevant domain can then be transmitted to the electronic device. Further, in these examples, the initial structured query is not utilized at block 816 to execute an associated task flow. Rather, a second structured query representing a second actionable intent associated with the second relevant domain can be generated at block 814. The second structured query can then be used at block 816 to execute an associated task flow.

At block 816, a task flow associated with the structured query can be executed. For example, a task flow processing module (e.g., task flow processing module 736) of the server can process the structured query (generated at block 814) to determine a task flow associated with the structured query. The task flow can include steps and instructions based on one or more task flow models (e.g., task flow models 754) associated with the actionable intent and the one or more parameters of the structured query. The task flow processing module can then execute the task flow in furtherance of satisfying the user request.

In some examples, executing the task flow can include obtaining data content that is relevant to satisfying the user request. The data content can be obtained from sources and services external to the server (e.g., external services 118) and can contain information requested by the user in the user request. In one example, the user request can be a request for movie show times for a specific time, location, and movie title, and the data content can include movie show times for the specified time, location, and movie title. In another example, the user request can be a request for navigation instructions and the data content can include the requested navigation instructions and related map drawings. In some examples, the data content can include information or instructions for outputting results (e.g., the results at blocks 828 or 832) on the electronic device. In particular, the data content can include formatting data, graphical user interface data, audio data, and the like that can be used to output results on the electronic device. In addition, the data content can include instructions for obtaining or deriving results on the electronic device. Further, in some examples, the data content can include metadata or attributes for identifying various aspects of the data content. In particular, the data content can be associated with one or more applications on the electronic device based on one or more attributes in the data content.

In some examples, it can be determined at block 816 that the task flow is unable to fulfill the user request. In particular, it can be determined that the obtained data content is unable to satisfy the user request. In these examples, in response to determining that the task flow or the obtained data content is unable to fulfill the user request, a second relevant domain of the set of predefined domains can be identified. The second domain signal can be identified based on the text string, the relevant domain, the task flow, and/or the data content. Further, in these examples, a second structured query representing a second actionable intent associated with the second relevant domain can be generated and a second task flow associated with the second structured query can be executed. Executing the second task flow can include obtaining second data content relevant to satisfying the user request. Further, in these examples, the data content that is unable to satisfy the user request is not transmitted to the electronic device at block 818. Instead, the second data content relevant to satisfying the user request can be transmitted at block 818.

At block 818, the data content can be transmitted to the electronic device. For example, the data content can be transmitted to the electronic device via a communication network using the I/O interface (I/O interface to DA client 112) of the server. The data content can be transmitted after blocks 814 and 816 are performed. Further, in some examples, the data content can be transmitted after the domain signal is transmitted at block 812.

At block 820, the domain signal can be received from the server by the electronic device. For example, the domain signal can be received at the communication circuitry (e.g., RF circuitry 208) of the electronic device. As described above, the domain signal can represent the relevant domain associated with the user request. In some examples, the relevant domain can be associated with an application on the electronic device. In some examples, the domain signal can be received prior to receiving the data content at block 826. In some examples, the domain signal can be received while the server generates the structured query at block 814 or executes the task flow at block 816.

As described above, it should be recognized that the transmitted domain signal at block 812 can represent more than one relevant domain signal, and thus, in some examples, the received domain signal at block 820 can represent more than one relevant domain associated with the user request. Specifically, in one example, the received domain signal can identify a first relevant domain and a second relevant domain. Further, in some examples, more than one domain signal can be received at block 820 where each domain signal represents a respective relevant domain. Specifically, in one example, a first domain signal representing a first relevant domain and a second domain signal representing a second relevant domain can be received. The first domain signal and the second domain signal can be received at separate times or concurrently. In some examples, all domain signals can be received prior to receiving the data content at block 826.

At block 822, it can be determined whether the relevant domain is associated with a predefined action of a set of predefined actions supported by the electronic device. The determination can be performed by the digital assistant client module (e.g., digital assistant client module 229) of the electronic device. As described above, the domain signal processing module (e.g., domain signal processing module 746) of the digital assistant client module can include one or more tables, databases, or models that relate a set of predefined domains to a respective set of predefined actions. Based on the one or more tables, databases, or models, the domain signal processing module can determine whether the relevant domain is one of the predefined domains in the set of predefined domains and then determine the respective predefined action corresponding to the relevant domain.

The predefined action can include any action supported by the electronic device. Further, the predefined action can include an action that is prerequisite to: processing the data content received at block 826, performing a task associated with the data content received at block 826, or outputting the result at block 828. In one example, the predefined action can include a task for preparing the electronic device to receive and/or process the data content received at block 826. In particular, the predefined action can include obtaining or deriving a prerequisite intermediate result required to either process the data content received at block 826 or output the result at block 828. In another example, the predefined action can include a task for preparing the electronic device to output the result at block 828. In particular, the predefined action can include a task for setting up an environment in the electronic device to output the result at block 828.

In some examples, one or more predefined actions of the set of predefined actions can be associated with an application of the electronic device. In these examples, the determination at block 822 can include initially determining whether the relevant domain is associated with an application of the electronic device and then determining a predefined action associated with the application. In particular, the predefined action can include loading the application from memory to operate in a background mode on the electronic device. Further, the predefined action can include executing instructions associated with the application. Process 900, described below, provides a detailed description of examples where one or more predefined actions of the set of predefined actions can be associated with an application of the electronic device.

As shown in FIG. 8A, blocks 824 through 828 can be performed in response to determining at block 822 that the relevant domain is associated with a predefined action on the electronic device. At block 824, the predefined action can be performed. In some examples, performing the predefined action can include executing instructions or tasks associated with the predefined action.

It should be recognized that in some cases, more than one predefined action can be performed at block 824. For example, a first and a second relevant domain associated with the user request can be represented by one or more domain signals received at block 820. In this example, it can be determined at block 822 that the first relevant domain is associated with a first predefined action and the second relevant domain is associated with a second predefined action and in response to this determination, the first and second predefined actions can be performed at block 824.

At block 826, data content relevant to satisfying the user request can be received from the server. For example, the data content can be received from the server using the communication circuitry (e.g., RF circuitry 208) of the electronic device. In some examples, the data content can be received from the server via a second electronic device (e.g., user device 122). In some examples, the data content can be received after the domain signal is received at block 820. In other examples, the data content can be received after the predefined action is at least partially performed at block 824.

The data content can contain information or instructions relevant to satisfying the user request. In some examples, the data content can contain information requested by the user. In other examples, the data content can contain information or instructions that can be used to derive or obtain the results to be outputted at block 828. In yet other examples, the data content can contain attributes used by the electronic device to output the result at block 828.

At block 828, a result based on the data content can be outputted to at least partially satisfy the user request. For example, the result can be outputted via any suitable interface (e.g., touch-sensitive display system 212, speaker 211, or tactile output generator 267) of the electronic device. In particular, the result can be outputted as a visual, sound, or tactile output from the electronic device in accordance with various attributes contained in the data content.

In some examples, the result can be derived or obtained based on the data content. In one such example, the electronic device can execute instructions contained in the data content to derive or obtain the result. In another such example, the data content can include attributes and/or parameter values and the electronic device can execute predefined tasks associated with the attributes and using the parameter values to obtain the result. In other examples, information contained in the data content can be directly outputted on the electronic device as the result. In one such example, a media file contained in the data content can be played on the electronic device as the outputted result. In another such example, text or values contained in the data content can be displayed on the electronic device as the outputted result. In yet another example, application-specific data in the data content can be presented using a relevant application on the electronic device. In these examples, the result can be directly outputted on the electronic device or formatted in accordance with attributes of the data content before being outputted. Further, in some examples, the data content can include formatting information that can be used by the electronic device to format the results prior to outputting the result.

As described above, outputting the result at block 828 can be based on the predefined action performed at block 824. In particular, performing the predefined action at block 824 can be prerequisite to outputting the result at block 828. For example, an environment, program, or intermediate result established by performing the predefined action can be used to output the result at block 828.

It should be appreciated that the domain signal in process 800 can serve to trigger the performance of the predefined action prior to receiving the data content at block 826. Thus, instead of waiting until after the data content is received at block 826 to perform the predefined action, the predefined action can be performed ahead of time. In cases where performing the predefined action is prerequisite to processing the data content of block 826 or outputting the result at block 828, the domain signal enables the predefined action to be at least partially performed by the time the data content is received. This enables the result to be outputted more quickly to the user. For instance, in an illustrative example, the user request can be a request for directions to a restaurant. The user request can be associated with the "find directions" domain and a domain signal representing the "find directions" domain can be received at the electronic device. It can be determined that the "find directions" domain is associated with the predefined action of loading the maps application on the electronic device. In response to this determination, the maps application can be pre-loaded on the electronic device before directions are received from the server. Therefore, when data content containing the directions to the restaurant is received, the directions can be outputted using the maps application without requiring additional time to load the maps application. Accordingly, the domain signal of process 800 can enable the electronic device to output a result that is responsive to the user request more quickly and efficiently.

As shown in FIGS. 8A-B, blocks 830 and 832 can be performed in response to determining at block 822 that the relevant domain is not associated with a predefined action of the set of predefined actions supported by the electronic device. At block 830, data content relevant to satisfying the user request can be received from the server. Block 830 can be similar or identical to block 826. At block 832, a second result based on the data content can be outputted to at least partially satisfy the user request. Block 832 can be similar or identical to block 828.

The data content received at block 830 can include information and/or instructions for outputting the result at block 832 without requiring a predefined action to be performed at block 824. For instance, in an example where the user request relates to finding a show time for a particular movie, the domain signal received at block 820 can represent the "find a movie" domain, which can be associated with a particular application on the electronic device for providing movie information. However, it can be determined that the particular application is not supported in the region where the user is located and thus it can be determined at block 822 that the "find a movie" domain is not associated with any predefined action of the set of predefined actions supported by the electronic device. In this example, the data content received at block 830 can include instructions to instead perform a local search for the user requested movie. The local search can then be performed by the electronic device at block 832 to obtain local search results for the particular movie and the results can be outputted to the user on the electronic device. Alternatively, the data content received at block 830 can already include local search results for the particular movie, which can be outputted to the user at block 832.

FIG. 9 illustrates process 900 for potentially reducing response latency of intelligent automated assistants according to various examples. In particular, process 900 describes specific examples of process 800 where the predefined action or the set of predefined actions at block 822 are associated with one or more applications of the electronic device. Although not shown, it should be recognized that process 900 can include blocks 802 through 818 of process 800. Further, blocks 902 through 922 can be performed by the client device (e.g., devices 104, 200, 400, or 600) of a server-client system (e.g., system 100). It should be recognized however that in other examples, the individual blocks of process 900 can be distributed in any appropriate manner among one or more computers, systems, or electronic devices. For instances, in some examples, process 900 can be performed entirely on an electronic device (e.g., devices 104, 200, 400, or 600.)

At block 902, it can be determined whether the relevant domain is associated with a predefined action of a set of predefined actions. Block 902 can be similar or identical to block 822 of process 800. Further, in some examples, the set of predefined actions can be associated with a respective set of applications on the electronic device. In these examples, it can be determined at block 902 whether the relevant domain is associated with an application of the set of applications on the electronic device. In response to determining that the relevant domain is associated with a first application of the set of applications, it can be determined at block 902 that the relevant domain is associated with the predefined action of loading the first application to operate in a background mode on the electronic device. As shown in FIG. 9, blocks 904 through 914 can be performed in response to determining that the relevant domain is associated with the predefined action of loading the first application associated with the relevant domain to operate in a background mode on the electronic device.

At block 904, the predefined action of loading the first application associated with the relevant domain to operate in a background mode on the electronic device can be performed. Loading the first application to operate in a background mode can include loading the first application from a memory of the electronic device. In particular, the first application can be loaded from a secondary memory of the electronic device to a primary memory of the electronic device. Operating an application in the background mode can refer to operating the application without the application interacting with the user via any user interface of the electronic device. In particular, an application operating in the background mode can operate without displaying any aspect (e.g., graphical user interface) of the application on the electronic device. Further, an application operating in background mode may not have access to device resources (e.g., processor(s) 220). In some examples, the loaded first application can remain in the background mode without displaying any aspect of the first application on the electronic device prior to outputting the result at block 914.

It should be recognized that in some examples, a plurality of applications can be loaded to operate in the background mode. In particular, one or more relevant domains represented by one or more domain signals received by the electronic device can be determined at block 902 to be associated with a plurality of applications on the electronic device. In these examples, each application of the plurality of applications can be loaded to operate in the background mode on the electronic device.

At block 906, data content can be received from the server. Block 906 can be similar or identical to block 826 of process 800. In some examples, block 906 can be performed after block 904 is at least partially performed. In particular, the data content can be received while the first application is operating in the background mode.

At block 908, it can be determined that the data content is associated with the first application. The determination can be made based on the data content. In particular, the data content can include information, such as attributes or tags, that identify the first application. Accordingly, it can be determined that the data content is associated with the first application based on the attributes or tags contained in the data content.

At block 910, in response to determining that the data content is associated with the first application, the data content can be directed to the first application. For example, the data content can be loaded into the first application. In some examples, block 910 can be performed while the first application is operating in the background mode.

In examples where a plurality of applications are loaded at block 904 to operate in the background mode, it can be determined at block 908 that the data content is associated with a particular application of the plurality of applications operating in the background mode. In response to this determination, the data content can be directed to that particular application.

At block 912, the data content can be processed using the first application to obtain a result. For example, the data content can include information and/or instructions that can be processed by the first application to obtain the result to be outputted at block 914. In some examples, the first application can execute instructions contained in the data content to derive or obtain the result. In one such example, the first application can be a search application and the data content can include instructions to perform a particular local search. In this example, the search application can perform the local search according to the instructions to obtain local search results to be outputted at block 914.

In other examples, the data content can include attributes and/or parameter values which the first application can utilize to prepare the result to be outputted at block 914. In one such example, the data content can include formatting information which can be used by the first application to format results for output at block 914. In another such example, the first application can be a maps application and the data content can include GPS coordinate information. In this example, the map application can process the GPS coordinate information to create a map to be outputted at block 914.

In yet other examples, the data content can include intermediate results and the first application can process the intermediate result to obtain the final result to be outputted at block 914. In one such example, the first application can be a speech application and the data content can include a sequence of phonemes. In this example, the speech application can convert the sequence of phonemes into speech to be outputted at block 914. In some examples, block 910 can be performed while the first application is operating in the background mode to obtain the result.

At block 912, the result based on the data content can be outputted. Block 912 can be similar to block 828. In addition, the result can be outputted using the first application. In some examples, outputting the result can include changing an operating mode of the first application from the background mode to an active mode. An application operating in an active mode can be permitted to interact with the user via a user interface of the electronic device. Further, an application operating in an active mode can have access to device resources (e.g., processor(s) 220). In some examples, the result can be outputted while the first application is operating in the active mode. In one such example, the result can be displayed on the electronic device via a graphic user interface of the first application while the first application is operating in the active mode. In another such example, the result can be outputted as an audio output on the electronic device while the first application is operating in the active mode.

With reference back to block 902, in some examples, it can be determined that the relevant domain is not associated with any application of the set of applications on the electronic device. In response to determining that the relevant domain is not associated with any application of the set of applications, it can be determined at block 902 that the relevant domain is not associated with any predefined action of the set of predefined actions. As shown in FIG. 9, blocks 916 through 928 of process 900 can be performed in response to determining that the relevant domain is not associated with any predefined action of the set of predefined actions.

At block 916, data content can be received from the server. Block 916 can be similar or identical to block 826 of process 800.

At block 918, it can be determined that the data content is associated with a second application of the electronic device. In some examples, the set of applications of block 902 may not include the second application. In some examples, the determination at block 918 can be made based on the data content. In particular, the data content can include information, such as attributes or tags, that identify the second application. Accordingly, it can be determined that the data content is associated with the second application based on attributes or tags contained in the data content. In response to determining that the data content is associated with the second application, blocks 920 through 928 can be performed.

At block 920, it can be determined whether the second application is operating on the electronic device. For example, the electronic device can determine whether the second application is one of a plurality of applications operating on the electronic device. Applications operating on the electronic device can refer to applications that have been loaded from memory and are operating either in the background mode or the active mode on the electronic device. Block 920 can be performed after the data content is received at block 916. As shown in FIG. 9, block 922 can be performed in response to determining that the second application is not operating on the electronic device while block 924 can be performed in response to determining that the second application is operating on the electronic device.

At block 922, the second application can be loaded from a memory of the electronic device to operate in the background mode. For example, the second application can be loaded from a secondary memory of the electronic device to a primary memory of the electronic device to operate in the background mode. In some examples, the loaded second application remains in the background mode and is not displayed on the electronic device prior to outputting the result at block 928.

At block 924, the data content can be directed to the second application. For example, the data content can be loaded into the second application. In some examples, the data content can be directed to the second application while the second application is operating in the background mode.

At block 926, the data content can be processed using the second application to obtain the result. The data content can be processed using the second application in a similar manner as described in block 912 with respect to the first application.

At block 928, the result based on the data content can be outputted on the electronic device. Block 928 can be similar to block 912. The result can be outputted using the second application. In some examples, outputting the result can include changing an operating mode of the second application from the background mode to an active mode. In some examples, the result can be outputted while the second application is operating in the active mode. In one such example, the result can be displayed on the electronic device via a graphic user interface of the second application while the second application is operating in the active mode. In another such example, the result can be outputted as an audio output on the electronic device while the second application is operating in the active mode.

In some examples, at least some of the communication between the electronic device and the server in processes 800 and 900 can occur via a second electronic device (e.g., user device 122). The second electronic device can serve as a proxy for the electronic device. In some examples, prior to the second electronic device serving as a proxy for the electronic device, the electronic device and the second electronic devices can be paired (e.g., Bluetooth pairing) to allow the devices to recognize each other and securely communicate with one another.

In some examples, the electronic device can determine whether a second electronic device is available to act as a proxy. If the second electronic device is available to act as a proxy, communication between the electronic device and the server can occur via the second electronic device. However, if the second electronic device is not available to act as a proxy, communication can occur directly between the electronic device and the server. For example, processes 800 and 900 can include determining whether the electronic device is communicatively coupled to a second electronic device. In some examples, such a determination can occur prior to transmitting information between the electronic device and the server. In a specific example, the determination can occur prior to block 804 of process 800. In response to determining that the electronic device is communicatively coupled to the second electronic device, the transmitting and receiving at any one of blocks 804, 806, 812, 818, 820, 826, 830, 906, and 916 can occur via the second electronic device. Conversely, in response to determining that the electronic device is not communicatively coupled to the second electronic device, the transmitting and receiving at blocks 804, 806, 812, 818, 820, 826, 830, 906, and 916 can occur directly between the electronic device and the server.

Although blocks 802 through 832 of process 800 and block 902 through 928 of process 900 are shown in a particular order in FIGS. 8A-B and 9, respectively, it should be appreciated that these blocks can be performed in any order. Further, it should be appreciated that in some cases, one or more blocks of processes 800 and 900 can be optional and additional blocks can also be performed.

5. Additional Exemplary Electronic Devices

Figure 10:
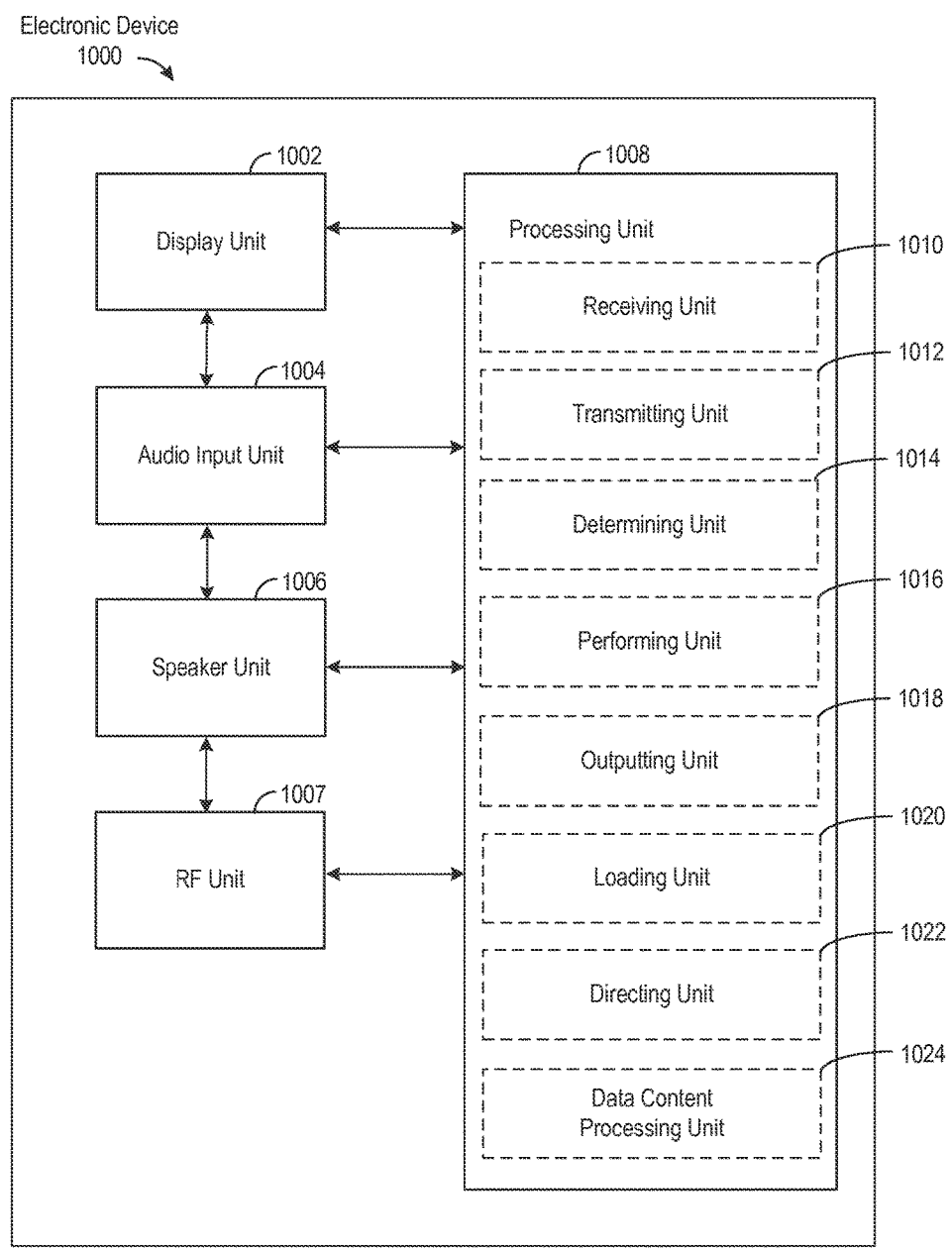
FIG. 10 illustrates a functional block diagram of an electronic device according to various examples.

FIG. 10 shows a functional block diagram of electronic device 1000 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 10 can be optionally combined or separated into sub-blocks to implement the principles of the various described examples. Therefore, the description herein optionally supports any possible combination, separation, or further definition of the functional blocks described herein.

As shown in FIG. 10, electronic device 1000 can include display unit 1002 configured to display a user interface and receive input from the user, audio input unit 1004 configured to receive speech input, speaker unit 1006 configured to output audio, and RF unit 1007 configured to transmit and receive data from external electronic devices. Electronic device 1000 can further include processing unit 1008 coupled to display unit 1002, audio input unit 1004, speaker unit 1006, and RF unit 1007. In some examples, processing unit 1008 can include receiving unit 1010, transmitting unit 1012, determining unit 1014, performing unit 1016, outputting unit 1018, loading unit 1020, directing unit 1022, and data content processing unit 1024.

Processing unit 1008 is configured to receive (e.g., with receiving unit 1010), via audio input unit 1004, a speech input containing a user request. Processing unit 1008 is further configured to transmit (e.g., transmitting unit 1012) using RF unit 1007, a representation of the speech input. Processing unit 1008 is further configured to receive (e.g., with receiving unit 1010) using RF unit 1007, a domain signal representing a relevant domain associated with the user request. Processing unit 1008 is further configured to determine (e.g., with determining unit 1014) whether the relevant domain is associated with a predefined action of a set of predefined actions supported by electronic device 1000. In response to determining that the relevant domain is associated with a predefined action on electronic device 1000, processing unit 1008 is further configured to perform (e.g., with performing unit 1016) the predefined action. Processing unit 1008 is further configured to receive (e.g., with receiving unit 1010) via RF unit 1007, data content relevant to satisfying the user request. Processing unit 1008 is further configured to output (e.g., with outputting unit 1018 and using displaying unit 1002 or speaker unit 1006) a result based on the data content to at least partially satisfy the user request.

In some examples, the domain signal is received prior to receiving the data content. In some examples, the data content is received after the predefined action is at least partially performed.

In some examples, the predefined action at least partially prepares electronic device 1000 to output the result. In some examples, the predefined action includes setting up an environment in electronic device 1000 to output the result. In some examples, performing the predefined action is prerequisite to outputting the result.

In some examples, processing unit 1008 is further configured to process (e.g., with data content processing unit 1024) the data content to obtain the result, wherein the predefined action is prerequisite to processing the data content.

In some examples, processing unit 1008 is further configured to perform (e.g., with performing unit 1016) a task based on the data content to obtain the result, wherein the predefined action is prerequisite to performing the task. In some examples, in response to determining that the relevant domain is not associated with any predefined action of the set of predefined actions supported by electronic device 1000, processing unit 1008 is further configured to perform (e.g., with performing unit 1016) a task based on the data content.

In some examples, the performed task is in accordance with an attribute of the data content. In some examples, the performed task is in accordance with instructions provided in the data content. In some examples, the result is obtained from performing the task. In some examples, the relevant domain is a domain of a domain-specific ontology that is relevant to the user request.

In some examples, the predefined action comprises loading an application associated with the relevant domain to operate in a background mode. In response to determining that the relevant domain is associated with the predefined action, processing unit 1008 is further configured to load (e.g., with loading unit 1020) the application from a memory of electronic device 1000 to operate in a background mode on electronic device 1000.

In some examples, in response to determining that the relevant domain is associated with the predefined action, processing unit 1008 is further configured to determine (e.g., with determining unit 1014) that data content is associated with the application and to direct (e.g., with directing unit 1022) the data content to the application while the application is operating in the background mode.

In some examples, in response to determining that the relevant domain is associated with the predefined action, processing unit 1008 is further configured to process (e.g., with data content processing unit 1024) the data content using the application while the application is operating in the background mode to obtain the result.

In some examples, in response to determining that the relevant domain is associated with the predefined action, processing unit 1008 is further configured to change (e.g., with outputting unit 1018) an operating mode of the application from the background mode to an active mode and to display (e.g., with outputting unit) the result on display unit 1002 via a graphic user interface of the application while the application is operating in the active mode.

In some examples, the application is not displayed on electronic device 1000 prior to receiving the data content.

In some examples, the set of predefined actions is associated with a set of applications on electronic device 1000. In response to determining that the relevant domain is not associated with any predefined action of the set of predefined actions, processing unit 1008 is further configured to determine (e.g., with determining unit 1014) that the data content is associated with a second application of electronic device 1000 and to process (e.g., with data content processing unit 1024) the data content using the second application to obtain the result. In these examples, the set of applications does not include the second application.

In some examples, in response to determining that the relevant domain is not associated with any predefined action of the set of predefined actions and in response to determining that the data content is associated with the second application, processing unit 1008 is further configured to determine (e.g., with determining unit 1014) whether the second application is operating on electronic device 1000. In these examples, in response to determining that the second application is not operating on electronic device 1000, processing unit 1008 is further configured to load (e.g., with loading unit 1020) the second application from the memory of electronic device 1000 to operate the second application in the background mode and to direct (e.g., with directing unit 1022) the data content to the second application while the second application operates in the background mode.

In some examples, in response to determining that the second application is operating on the electronic device, processing unit 1008 is further configured to direct (e.g., with directing unit 1022) the data content to the second application.

In some examples, in response to determining that the relevant domain is not associated with any predefined action of the set of predefined actions, processing unit 1008 is further configured to change (e.g., with outputting unit 1018) an operating mode of the second application from the background mode to an active mode and to display (e.g., with output unit 1018) the result on display unit 1002 via a graphic user interface of the second application while the second application is operating in the active mode.

In some examples, processing unit 1008 is further configured to determine (e.g., with determining unit 1014) whether electronic device 1000 is communicatively coupled to a second electronic device. In these examples, in response to determining that electronic device 1000 is communicatively coupled to the second electronic device, the representation of the speech input is transmitted to the server via the second electronic device, the domain signal is received from the server via the second electronic device, and the data content is received from the server via the second electronic device. In some examples, processing unit 1008 is further configured to determine (e.g., with determining unit 1014) whether electronic device 1000 is communicatively coupled to a second electronic device prior to transmitting the representation of the speech input.

In some examples, in response to determining that electronic device 1000 is not communicatively coupled to the second electronic device, the representation of the speech input is transmitted directly to a server, the domain signal is received directly from the server, and the data content is received directly from the server.

In some examples, processing unit 1008 is further configured to receive (e.g., with receiving unit 1010) via RF unit 1007, a second domain signal identifying a second relevant domain associated with the user request. Processing unit 1008 is further configured to determine (e.g., with determining unit 1014) whether the second relevant domain is associated with a second predefined action of the set of predefined actions supported by the electronic device. In response to determining that the relevant domain is associated with a second predefined action of the set of predefined actions, processing unit 1008 is further configured to perform (e.g., with performing unit 1016) the second predefined action.

In some examples, the domain signal further identifies a second relevant domain associated with the user request. In these examples, processing unit 1008 is further configured to determine (e.g., with determining unit 1014) whether the second relevant domain is associated with a second predefined action of the set of predefined actions supported by electronic device 1000. In response to determining that the relevant domain is associated with a second predefined action of the set of predefined actions supported by electronic device 1000, processing unit 1008 is further configured to perform (e.g., with performing unit 1016) the second predefined action.

In some examples, the second predefined action includes loading a second application from the memory to operate in the background mode.

The operations described above with reference to FIGS. 8A-B and 9 can be optionally implemented by components depicted in FIG. 1, 2A, 4, 6A-B, 7A, or 9. For example, receiving operations 802, 820, 826; transmitting operation 804; determining operation 822; performing operation 824; and outputting operation 828 are, optionally implemented by communication module 228, digital assistant client module 229, domain signal processing module, and graphics module 232. For example, digital assistant client module 229 can receive, via microphone 213, a speech input containing a user request and communication module 228 can transmit a representation of the speech input using RF circuitry 208. Communication module 228 can further receive, via RF circuitry 208, a domain signal representing a relevant domain associated with the user request. Domain signal processing module 749 can determine whether the relevant domain is associated with a predefined action of a set of predefined actions supported by electronic device 1000. In response to determining that the relevant domain is associated with a predefined action on electronic device 1000, domain signal processing module 749 can perform the predefined action. Communication module 228 can further receive, via RF circuitry 208, data content relevant to satisfying the user request. Digital assistant client module 229 and/or graphics module 232 can output (e.g., on touch sensitive display system 212 or using speaker 211) a result based on the data content to at least partially satisfy the user request. Similarly, it would be clear to a person having ordinary skill in the art how other processes can be implemented based on the components depicted in FIGS. 1, 2A, 4, 6A-B, and 7A-C.

Figure 11:
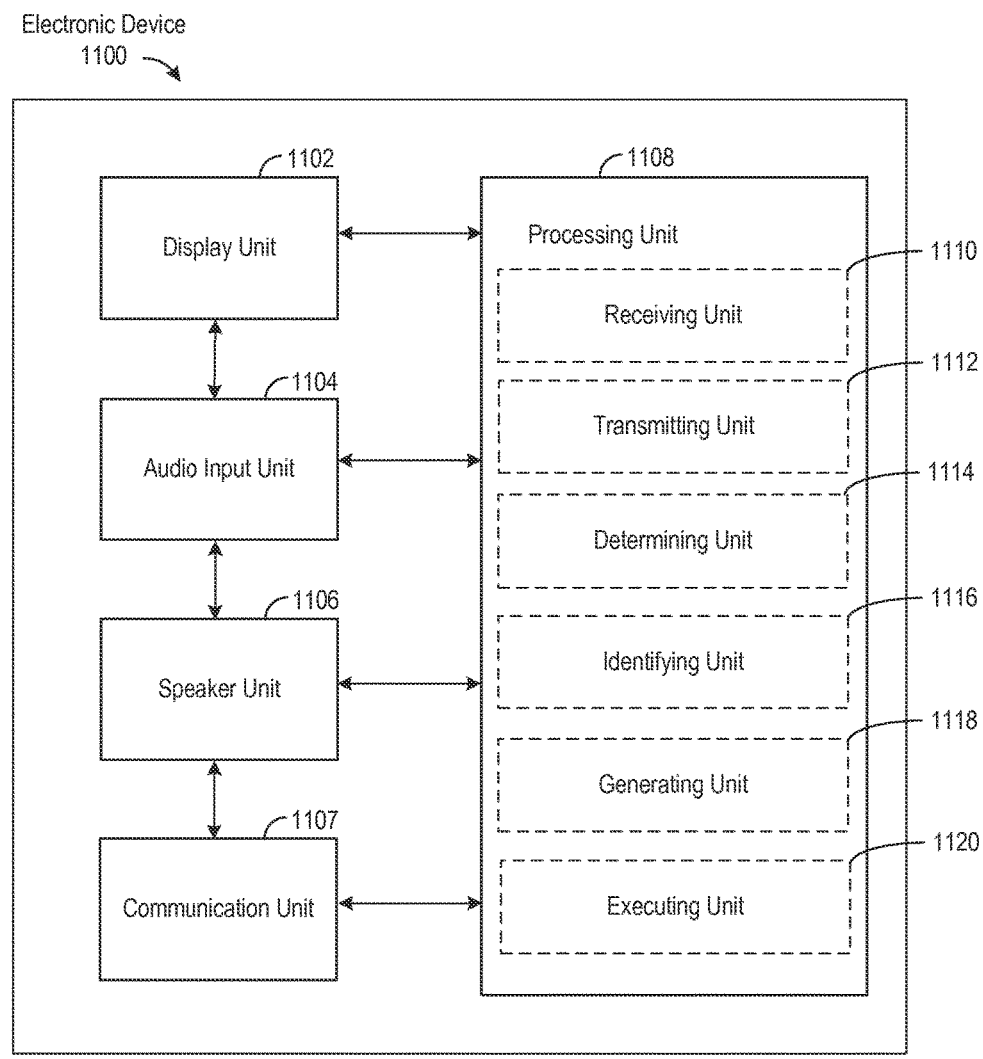
FIG. 11 illustrates a functional block diagram of an electronic device according to various examples.

FIG. 11 shows a functional block diagram of electronic device 1100 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 11 can be optionally combined or separated into sub-blocks to implement the principles of the various described examples. Therefore, the description herein optionally supports any possible combination, separation, or further definition of the functional blocks described herein.

As shown in FIG. 11, electronic device 1100 can include communication unit 1107 configured to transmit and receive data from external electronic devices. In some examples, electronic device 1100 can optionally include display unit 1102 configured to display a user interface, audio input unit 1104 configured to receive speech input, and speaker unit 1106 configured to output audio. Electronic device 1100 can further include processing unit 1108 coupled to display unit 1102, audio input unit 1104, speaker unit 1106, and RF unit 1107. In some examples, processing unit 1108 can include receiving unit 1110, transmitting unit 1112, determining unit 1114, identifying unit 1116, generating unit 1118, and executing unit 1120.

Processing unit 1108 can be configured to receive (e.g., with receiving unit 1110) via communication unit 1107, a representation of a speech input containing a user request. Processing unit 1108 can be further configured to determine (e.g., with determining unit 1114) a text string corresponding to the user request. Processing unit 1108 can be further configured to identify (e.g., with identifying unit 1116), based on the text string, a relevant domain from a plurality of predefined domains. Processing unit 1108 can be further configured to transmit (e.g., with transmitting unit 1112), using communication unit 1107, a domain signal representing the relevant domain. Processing unit 1108 can be further configured to generate (e.g., with generating unit 1118) a structured query representing an actionable intent associated with the relevant domain. Processing unit 1108 can be further configured to execute (e.g., with executing unit 1120) a task flow associated with the structured query. Processing unit 1108 can be further configured to obtain (e.g., with executing unit) data content relevant to satisfying the user request. Processing unit 1108 can be further configured to transmit (e.g., with transmitting unit 1112), using communication unit 1107, the data content.

In some examples, the domain signal is transmitted after the relevant domain is identified and while the structured query is generated. In some examples, the domain signal is transmitted before the data content is transmitted. In some examples, the relevant domain is associated with a predefined action to be performed on the electronic device. In some examples, the relevant domain is associated with an application.

In some examples, processing unit 1108 can be further configured to parse (e.g., with generating unit 1118) the text string and to populate (e.g., with generating unit 1118) a parameter of the structured query with relevant information derived from parsing the text string.

In some examples, processing unit 1108 can be further configured to transmit (e.g., with transmitting unit 1112), using communication unit 1107, the text string prior to transmitting the domain signal.

In some examples, the relevant domain is identified while the text string is being determined and based on a beginning portion of the text string.

In some examples, the plurality of predefined domains are domains of a domain-specific ontology.

In some examples, in response to determining that the task flow is unable to fulfill the user request, processing unit 1108 can be further configured to identify (e.g., with identifying unit 1116) a second relevant domain of the plurality of predefined domains and to transmit (e.g., with transmitting unit 1112), using communication unit 1107, a second domain signal representing the second relevant domain.

In some examples, in response to determining that the obtained data content is unable to fulfill the user request, processing unit 1108 can be further configured to identify (e.g., with identifying unit 1116) a second relevant domain of the plurality of predefined domains and to transmit (e.g., with transmitting unit 1112), using communication unit 1107, a second domain signal representing the second relevant domain.

In some examples, processing unit 1108 can be further configured to generate (e.g., with generating unit 1118) a second structured query representing a second actionable intent associated with the second relevant domain. Processing unit 1108 can be further configured to execute (e.g., with executing unit 1120) a second task flow associated with the second structured query. Processing unit 1108 can be further configured to obtain (e.g., with executing unit 1120) a second data content relevant to satisfying the user request. Processing unit 1108 can be further configured to transmit (e.g., with transmitting unit 1112), using communication unit 1107, the second data content.

In some examples, the representation of a speech input is received via a second electronic device. In these examples, the domain signal is transmitted via the second electronic device and the data is transmitted via the second electronic device.

In some examples, the representation of a speech input is received directly from the electronic device. In these examples, the domain signal is transmitted directly to the electronic device and the data is transmitted directly to the electronic device.

In some examples, processing unit 1108 can be further configured to receive (e.g., with receiving unit 1110), via communication unit 1107, a representation of a speech input containing a user request. Processing unit 1108 can be further configured to determine (e.g., with determining unit 1114) a text string corresponding to the user request. Processing unit 1108 can be further configured to identify (e.g., with identifying unit 1116), based on the text string, a relevant domain from a plurality of predefined domains. Processing unit 1108 can be further configured to transmit (e.g., with transmitting unit 1112), using communication unit 1107, a domain signal representing the relevant domain. Processing unit 1108 can be further configured to generate (e.g., with generating unit 1118) a structured query representing an actionable intent associated with the relevant domain. In response to determining that a task flow associated with the structured query is unable to satisfy the user request, processing unit 1108 can be further configured to identify (e.g., with identifying unit 1116) a second relevant domain of the plurality of predefined domains, to transmit (e.g., with transmitting unit 1112), using communication unit 1107, a second domain signal representing the second relevant domain, to generate (e.g., with generating unit 1118) a second structured query representing a second actionable intent associated with the second domain, to execute (e.g., with executing unit 1120) a second task flow associated with the second structured query, and to transmit (e.g., transmitting unit 1112), using communication unit 1107, the data content to the electronic device. Processing unit 1108 can be further configured to obtain (e.g., using executing unit 1120) data content relevant to satisfying the user request.

The operations in the information processing methods described above are, optionally implemented by running one or more functional modules in information processing apparatus such as general purpose processors (e.g., as described above with respect to FIG. 2A, 4, 6, 7A) or application specific chips.

The operations described above with reference to FIGS. 8A-B and 9 can be optionally implemented by components depicted in FIG. 1, 2A, 4, 6A-B, 7A, 10, or 11. For example, receiving operation 806; determining operation 808; identifying operation 810; transmitting operations 812, 818; generating operation 814; and executing operation 816, can be optionally implemented by I/O processing module 728, STT processing module 730, natural language processing module 732, and task flow processing module 736. I/O processing module 728 can receive (e.g., via wireless circuitry 714 or wired communications port 712) a representation of a speech input containing a user request. determine (e.g., with determining unit 1114) a text string corresponding to the user request. STT processing module 730 can identify, based on the text string, a relevant domain from a plurality of predefined domains. I/O processing module 728 can transmit (e.g., using wireless circuitry 714 or wired communications port 712) a domain signal representing the relevant domain. Natural language processing module 732 can generate a structured query representing an actionable intent associated with the relevant domain. Task flow processing module 736 can execute a task flow associated with the structured query and obtain data content relevant to satisfying the user request. I/O processing module 728 can transmit (e.g., using wireless circuitry 714 or wired communications port 712) the data content. Similarly, it would be clear to a person having ordinary skill in the art how other processes can be implemented based on the components depicted in FIGS. 1, 2A, 4, 6A-B, and 7A-C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for reducing response latency of intelligent automated assistants, the method comprising:
   at an electronic device:
      receiving, from a user, a speech input containing a user request;
      transmitting, to a server, a representation of the speech input;
      receiving, from the server, a domain signal defining a relevant domain of an actionable intent inferred from the user request;
      determining whether the relevant domain is associated with a predefined action of a set of predefined actions supported by the electronic device;
      in response to determining that the relevant domain is associated with a predefined action on the electronic device, performing the predefined action;
      after at least partially performing the predefined action, receiving, from the server, data content relevant to satisfying the user request,
         wherein the data content is generated according to an executed task flow corresponding to the actionable intent, and
         wherein performing the predefined action at least partially prepares the electronic device to process the received data content; and
      outputting a result based on the data content to at least partially satisfy the user request.

2. The method of claim 1, further comprising processing the data content to obtain the result, wherein performing the predefined action is prerequisite to processing the data content.

3. The method of claim 1, further comprising performing a task based on the data content to obtain the result, wherein performing the predefined action is prerequisite to performing the task.

4. The method of claim 1, further comprising:
   in response to determining that the relevant domain is not associated with any predefined action of the set of predefined actions supported by the electronic device, performing a task based on the data content.

5. The method of claim 4, wherein the performed task is in accordance with instructions provided in the data content.

6. The method of claim 4, wherein the result is obtained from performing the task.

7. The method of claim 1, wherein the relevant domain is a domain of a domain-specific ontology that is relevant to the user request.

8. The method of claim 1, wherein the predefined action comprises loading an application associated with the relevant domain to operate in a background mode, and wherein in response to determining that the relevant domain is associated with the predefined action:
   loading the application from a memory of the electronic device to operate in a background mode on the electronic device.

9. The method of claim 8, further comprising:
   in response to determining that the relevant domain is associated with the predefined action:
      determining that the data content is associated with the application; and
      directing the data content to the application while the application is operating in the background mode.

10. The method of claim 8, further comprising:
    in response to determining that the relevant domain is associated with the predefined action:
       processing the data content using the application while the application is operating in the background mode to obtain the result.

11. The method of claim 8, wherein in response to determining that the relevant domain is associated with the predefined action, outputting the result includes:
    changing an operating mode of the application from the background mode to an active mode; and
    displaying the result on the electronic device via a graphic user interface of the application while the application is operating in the active mode.

12. The method of claim 1, wherein the set of predefined actions is associated with a set of applications on the electronic device, and further comprising:
    in response to determining that the relevant domain is not associated with any predefined action of the set of predefined actions:
       determining that the data content is associated with a second application of the electronic device, wherein the set of applications does not include the second application; and
    processing the data content using the second application to obtain the result.

13. The method of claim 12, further comprising:
    in response to determining that the relevant domain is not associated with any predefined action of the set of predefined actions, and in response to determining that the data content is associated with the second application:
       determining whether the second application is operating on the electronic device;
    in response to determining that the second application is not operating on the electronic device:
       loading the second application from the memory of the electronic device to operate the second application in a background mode; and
       directing the data content to the second application while the second application operations in the background mode.

14. The method of claim 13, further comprising:
    in response to determining that the second application is operating on the electronic device, directing the data content to the second application.

15. The method of claim 12, wherein in response to determining that the relevant domain is not associated with any predefined action of the set of predefined actions, outputting the result includes:
    changing an operating mode of the second application from the background mode to an active mode; and displaying the result on the electronic device via a graphic user interface of the second application while the second application is operating in the active mode.

16. The method of claim 1, further comprising:
determining whether the electronic device is communicatively coupled to a second electronic device, wherein in response to determining that the electronic device is communicatively coupled to the second electronic device:
the representation of the speech input is transmitted to the server via the second electronic device;
the domain signal is received from the server via the second electronic device; and
the data content is received from the server via the second electronic device.

17. The method of claim 16, wherein determining whether the electronic device is communicatively coupled to a second electronic device is performed prior to transmitting the representation of the speech input.

18. The method of claim 16, wherein in response to determining that the electronic device is not communicatively coupled to the second electronic device:
the representation of the speech input is transmitted directly to a server;
the domain signal is received directly from the server; and
the data content is received directly from the server.

19. The method of claim 1, further comprising:
receiving, from the server, a second domain signal identifying a second relevant domain associated with the user request;
determining whether the second relevant domain is associated with a second predefined action of the set of predefined actions supported by the electronic device; and
in response to determining that the relevant domain is associated with a second predefined action of the set of predefined actions, performing the second predefined action.

20. The method of claim 1, wherein the domain signal further identifies a second relevant domain associated with the user request, and further comprising:
determining whether the second relevant domain is associated with a second predefined action of the set of predefined actions supported by the electronic device; and
in response to determining that the relevant domain is associated with a second predefined action of the set of predefined actions supported by the electronic device, performing the second predefined action.

21. The method of claim 1, wherein performing the predefined action does not contribute to the generation of the data content.

22. The method of claim 1, wherein the domain signal is received while a structured query corresponding to the actionable intent is generated or while the task flow corresponding to the actionable intent is executed.

23. A non-transitory computer-readable storage medium comprising computer-executable instructions, which when executed by one or more processors, causes the one or more processors to:
receive, from a user, a speech input containing a user request;
transmit, to a server, a representation of the speech input;
receive, from the server, a domain signal defining a relevant domain of an actionable intent inferred from the user request;
determine whether the relevant domain is associated with a predefined action of a set of predefined actions supported by the electronic device;
in response to determining that the relevant domain is associated with a predefined action on the electronic device, perform the predefined action;
after at least partially performing the predefined action, receive, from the server, data content relevant to satisfying the user request,
wherein the data content is generated according to an executed task flow corresponding to the actionable intent, and
wherein performing the predefined action at least partially prepares the electronic device to process the received data content; and
output a result based on the data content to at least partially satisfy the user request.

24. The non-transitory computer-readable storage medium of claim 23, wherein the one or more programs further include instructions, which when executed by the one or more processors, causes the one or more processors to:
in response to determining that the relevant domain is not associated with any predefined action of the set of predefined actions supported by the electronic device, perform a task based on the data content.

25. The non-transitory computer-readable storage medium of claim 23, wherein the predefined action comprises loading an application associated with the relevant domain to operate in a background mode, and wherein the one or more programs further include instructions, which when executed by the one or more processors, causes the one or more processors to:
in response to determining that the relevant domain is associated with the predefined action:
load the application from a memory of an electronic device to operate in a background mode on the electronic device.

26. The non-transitory computer-readable storage medium of claim 23, wherein the set of predefined actions is associated with a set of applications on an electronic device, and wherein the one or more programs further include instructions, which when executed by the one or more processors, causes the one or more processors to:
in response to determining that the relevant domain is not associated with any predefined action of the set of predefined actions:
determine that the data content is associated with a second application of the electronic device, wherein the set of applications does not include the second application; and
process the data content using the second application to obtain the result.

27. The non-transitory computer-readable storage medium of claim 23, wherein the one or more programs further include instructions, which when executed by the one or more processors, causes the one or more processors to:
receive, from the server, a second domain signal identifying a second relevant domain associated with the user request;
determine whether the second relevant domain is associated with a second predefined action of the set of predefined actions supported by the electronic device; and in response to determining that the relevant domain is associated with a second predefined action of the set of predefined actions, perform the second predefined action.

28. A system comprising:
one or more processors;
memory storing computer-readable instructions, which when executed by the one or more processors, causes the one or more processors to:
  receive, from a user, a speech input containing a user request;
  transmit, to a server, a representation of the speech input;
  receive, from the server, a domain signal defining a relevant domain of an actionable intent inferred from the user request;
  determine whether the relevant domain is associated with a predefined action of a set of predefined actions supported by the electronic device;
  in response to determining that the relevant domain is associated with a predefined action on the electronic device, perform the predefined action;
  after at least partially performing the predefined action, receive, from the server, data content relevant to satisfying the user request,
    wherein the data content is generated according to an executed task flow corresponding to the actionable intent, and
    wherein performing the predefined action at least partially prepares the electronic device to process the received data content; and
  output a result based on the data content to at least partially satisfy the user request.

29. The system of claim 28, wherein the one or more programs further include instructions for:
  in response to determining that the relevant domain is not associated with any predefined action of the set of predefined actions supported by the electronic device, performing a task based on the data content.

30. The system of claim 28, wherein the predefined action comprises loading an application associated with the relevant domain to operate in a background mode, and wherein the one or more programs further include instructions for:
  in response to determining that the relevant domain is associated with the predefined action:
    loading the application from a memory of an electronic device to operate in a background mode on the electronic device.

31. The system of claim 28, wherein the set of predefined actions is associated with a set of applications on the electronic device, and wherein the one or more programs further include instructions for:
  in response to determining that the relevant domain is not associated with any predefined action of the set of predefined actions:
    determining that the data content is associated with a second application of the electronic device, wherein the set of applications does not include the second application; and
    processing the data content using the second application to obtain the result.

32. The system of claim 28, wherein the one or more programs further include instructions for:
  receiving, from the server, a second domain signal identifying a second relevant domain associated with the user request;
  determining whether the second relevant domain is associated with a second predefined action of the set of predefined actions supported by the electronic device; and
  in response to determining that the relevant domain is associated with a second predefined action of the set of predefined actions, performing the second predefined action.

* * * * *